US011750064B2

(12) United States Patent
Inuzuka

(10) Patent No.: US 11,750,064 B2
(45) Date of Patent: Sep. 5, 2023

(54) ELECTRIC TOOL

(71) Applicant: MAKITA CORPORATION, Anjo (JP)

(72) Inventor: Junya Inuzuka, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 17/704,141

(22) Filed: Mar. 25, 2022

(65) Prior Publication Data

US 2022/0224173 A1 Jul. 14, 2022

Related U.S. Application Data

(63) Continuation of application No. 16/611,521, filed as application No. PCT/JP2018/021409 on Jun. 4, 2018, now abandoned.

(30) Foreign Application Priority Data

| Jun. 14, 2017 | (JP) | 2017-117093 |
| Jun. 14, 2017 | (JP) | 2017-117094 |
| Jun. 14, 2017 | (JP) | 2017-117095 |
| Jun. 14, 2017 | (JP) | 2017-117096 |

(51) Int. Cl.

| H02K 7/14 | (2006.01) |
| H02K 1/16 | (2006.01) |
| H02K 1/18 | (2006.01) |
| H02K 11/33 | (2016.01) |
| H02K 3/34 | (2006.01) |

(Continued)

(52) U.S. Cl.
CPC .............. *H02K 7/145* (2013.01); *H02K 1/16* (2013.01); *H02K 1/18* (2013.01); *H02K 3/34* (2013.01); *H02K 3/46* (2013.01); *H02K 11/33* (2016.01); *B25F 5/00* (2013.01)

(58) Field of Classification Search
CPC . H02K 11/33; H02K 1/18; H02K 9/06; H02K 1/20; H02K 1/16; H02K 3/46; H02K 3/34; H02K 1/185; H02K 1/148; H02K 3/522; H02K 7/145; H02K 2201/06;
(Continued)

(56) References Cited

U.S. PATENT DOCUMENTS

| 6,087,755 A | 7/2000 | Suzuki et al. |
| 6,411,006 B2 | 6/2002 | Suzuki et al. |

(Continued)

FOREIGN PATENT DOCUMENTS

| CN | 1881745 A | 12/2006 |
| CN | 101171733 A | 4/2008 |

(Continued)

OTHER PUBLICATIONS

Okubo M, Manufacturing Method of the Left and Right Rotary Brushless Motor for an Electric Power Steering Apparatus, Feb. 17, 2016, JP 5864839 (English Machine Translation) (Year: 2016).*

(Continued)

*Primary Examiner* — Alexander A Singh
(74) *Attorney, Agent, or Firm* — Oliff PLC

(57) ABSTRACT

In the brushless motor disposed in a hammer drill, while a stator core of a stator is formed by joining a plurality of divided cores divided in a circumferential direction, varnishes are applied over a coil and joining portions between the divided cores.

7 Claims, 26 Drawing Sheets

(51) Int. Cl.
    *H02K 3/46*         (2006.01)
    *B25F 5/00*         (2006.01)
(58) Field of Classification Search
    CPC ........ H02K 7/14; H02K 11/21; H02K 11/215;
                                        B25D 11/125; B25F 5/00
    USPC ...................................................... 310/47, 50
    See application file for complete search history.

(56)              References Cited

U.S. PATENT DOCUMENTS

| | | | |
|---|---|---|---|
| 7,595,578 | B2 | 9/2009 | Aramaki et al. |
| 8,729,748 | B2 | 5/2014 | Ueno et al. |
| 9,203,274 | B2 | 12/2015 | Tashiro et al. |
| 10,298,098 | B2 | 5/2019 | Niwa |
| 10,630,120 | B2 | 4/2020 | Sakai et al. |
| 2003/0160533 | A1 | 8/2003 | Suzuki et al. |
| 2005/0220641 | A1 | 10/2005 | Nagata et al. |
| 2007/0024149 | A1 | 2/2007 | Nagata et al. |
| 2009/0058215 | A1 | 3/2009 | Murakami et al. |
| 2009/0066183 | A1* | 3/2009 | Aramaki ............... H02K 1/148 310/216.008 |
| 2009/0127972 | A1 | 5/2009 | Ishida et al. |
| 2011/0169351 | A1 | 7/2011 | Hessenberger et al. |
| 2011/0169358 | A1 | 7/2011 | Furukawa et al. |
| 2012/0062051 | A1 | 3/2012 | Ueno et al. |
| 2013/0000936 | A1 | 1/2013 | Onoda et al. |
| 2013/0098734 | A1 | 4/2013 | Eguchi et al. |
| 2015/0020391 | A1* | 1/2015 | Abe .................. B25F 5/008 30/388 |
| 2015/0069864 | A1 | 3/2015 | Nagahama et al. |
| 2015/0180307 | A1* | 6/2015 | Inuzuka ................. B25F 5/008 310/50 |
| 2016/0380510 | A1* | 12/2016 | Niwa .................... H02K 3/522 310/50 |
| 2017/0155290 | A1 | 6/2017 | Isakai et al. |
| 2018/0358846 | A1 | 12/2018 | Baba et al. |

FOREIGN PATENT DOCUMENTS

| | | | |
|---|---|---|---|
| CN | 102449879 | A | 5/2012 |
| JP | S51-5903 | U | 1/1976 |
| JP | S53-77805 | A | 7/1978 |
| JP | S56-74937 | U | 6/1981 |
| JP | S59-161361 | U | 10/1984 |
| JP | S63-174531 | A | 7/1988 |
| JP | H01-303029 | A | 12/1989 |
| JP | H04-58746 | A | 2/1992 |
| JP | H05-292708 | A | 11/1993 |
| JP | H07-107725 | A | 4/1995 |
| JP | H09-19089 | A | 1/1997 |
| JP | H11-55879 | A | 2/1999 |
| JP | 2001-327109 | A | 11/2001 |
| JP | 2004-72824 | A | 3/2004 |
| JP | 2004-180383 | A | 6/2004 |
| JP | 2004-194458 | A | 7/2004 |
| JP | 2005-012861 | A | 1/2005 |
| JP | 2005-117711 | A | 4/2005 |
| JP | 2005-193310 | A | 7/2005 |
| JP | 2006-109636 | A | 4/2006 |
| JP | 2006-191703 | A | 7/2006 |
| JP | 2006-238612 | A | 9/2006 |
| JP | 2008-178223 | A | 7/2008 |
| JP | 2008-206302 | A | 9/2008 |
| JP | 2009-207252 | A | 9/2009 |
| JP | 2011-250545 | A | 12/2011 |
| JP | 2012-13150 | A | 1/2012 |
| JP | 2013-9459 | A | 1/2013 |
| JP | 2013-013960 | A | 1/2013 |
| JP | 2013-158156 | A | 8/2013 |
| JP | 2014-138434 | A | 7/2014 |
| JP | 2015-27171 | A | 2/2015 |
| JP | 2015-056953 | A | 3/2015 |
| JP | 2015-95974 | A | 5/2015 |
| JP | 5864839 | B2 * | 2/2016 |
| JP | 2016-59096 | A | 4/2016 |
| JP | 2016-140965 | A | 8/2016 |
| JP | 2016-215373 | A | 12/2016 |
| JP | 2017-7068 | A | 1/2017 |
| JP | 2017-35784 | A | 2/2017 |
| JP | 2017-87412 | A | 5/2017 |
| WO | 2011/118357 | A1 | 9/2011 |
| WO | 2015/145901 | A1 | 10/2015 |
| WO | 2016/129287 | A1 | 8/2016 |

OTHER PUBLICATIONS

Aug. 28, 2018 International Search Report issued in International Patent Application No. PCT/JP2018/021409.
Aug. 28, 2018 Written Opinion issued in International Patent Application No. PCT/JP2018/021409.
Dec. 17, 2019 International Preliminary Reporton Patentability issued in International Patent Application No. PCT/JP2018/021409.
Aug. 18, 2020 Notice of Submisssion of Publication issued in Japanese Patent Application No. 2017-117096.
Apr. 27, 2021 Office Action issued in Japanese Patent Application No. 2017-117093.
May 6, 2021 Office Action issued in Japanese Patent Application No. 2017-117094.
Apr. 27, 2021 Office Action issued in Japanese Patent Application No. 2017-117095.
May 6, 2021 Office Action issued in Japanese Patent Application No. 2017-117096.
Jun. 30, 2021 Office Action issued in Chinese Patent Application No. 201880039796.8.
Nov. 30, 2021 Office Action issued in Japanese Patent Application No. 2017-117096.
Nov. 30, 2021 Office Action issued in Japanese Patent Application No. 2017-117094.
Jan. 27, 2022 Office Action issued in Chinese Patent Application No. 201880039796.8.
Mar. 10, 2023 Office Action cited in Japanese Patent Application No. 2022-099084.
Oct. 31, 2022 Office Action issued in Japanese Patent Application No. 2021-209779.

* cited by examiner

ELECTRIC TOOL

This application is a Continuation of application Ser. No. 16/611,521, filed Nov. 7, 2019, which in turn claims the benefit of International Application No. PCT/JP2018/021409, filed on Jun. 4, 2018, Japanese Patent Application Number No. 2017-117093 filed on Jun. 14, 2017, Japanese Patent Application Number No. 2017-117094 filed on Jun. 14, 2017, Japanese Patent Application Number No. 2017-117095 filed on Jun. 14, 2017, and Japanese Patent Application Number No. 2017-117096 filed on Jun. 14, 2017, the entirety of which is incorporated by reference.

BACKGROUND OF INVENTION

Technical Field

The present invention relates to an electric tool, such as a hammer drill, using a brushless motor as a driving source.

Background Art

A brushless motor (see Japanese Laid Open Patent Publication No. 2017-35784) that is compact and excellent in durability is used as a driving source of an electric tool. Recently, with an advance of a performance of a battery cell serving as a power supply, electric power input to the brushless motor has been increasing while the brushless motor has been also required to have an increased output.

To increase the output, thinning of electromagnetic steel plates is considered against a high space factor of a winding wire, an increase in size of the winding wire, and an increase in iron loss (heat loss) in a stator core. However, as in Japanese Laid Open Patent Publication No. 2017-35784, in the case of an integrated stator core, a coil is forced to be formed in a narrow space inside the stator core, making the high space factor difficult. Additionally, a thin steel plate costs high and leads to a cost increase without improvement of the yield.

Therefore, manufacturing a stator core by dividing the stator core and coupling a plurality of components is considered. Such a divided structure allows a large-sized stator core, achieves a high space factor, and further a yield in punching of an electromagnetic steel plate decreases and therefore a cost reduction can be expected.

DISCLOSURE OF THE INVENTION

Problems to be Solved by the Invention

However, with an electric tool, there is a situation where a working environment is severe, such as vibrations, dust, and an impact due to falling. Therefore, configuring a stator core of a brushless motor used in such a situation to be a divided structure has possibly resulted in deterioration of durability and a dust-proof performance.

In order to achieve downsizing and a weight reduction of the motor, since a surface area of the motor decreases, a cooling performance possibly gets worse. Especially, although the use of the above-described divided cores allows downsizing of the motor while efficiency and an output remain equivalent, the cooling performance is difficult to be improved.

Furthermore, vibrations cause disconnection of a coil in the electric tool in some cases, and there may be case where an extra terminal process is required.

In addition, the electric tool is sometimes used in the severe situation, such as dust and falling, in addition to vibrations, a concern remains about durability and a dust-proof performance in the divided structure where the stator core is divided in a circumferential direction.

Therefore, an object of the present invention is to provide an electric tool that achieves a high space factor and a low cost by configuring a stator core of a brushless motor as a divided structure and also allows ensuring durability and a dust-proof performance.

Further, an object of the present invention is to provide the electric tool that achieves the high space factor and the low cost by configuring the stator core of the brushless motor as the divided structure and also allows improving a cooling performance.

Furthermore, an object of the present invention is to provide the electric tool that can preferably reduce disconnection of a coil.

In addition, an object of the present invention is to provide the electric tool excellent in the durability and the dust-proof performance even when the stator core is divided.

Solutions to the Problems

In order to achieve the above-described object, there is provided an electric tool according to the present invention. The electric tool includes a brushless motor including a stator, a rotor, and a plurality of coils. The stator includes a stator core formed by laminating electromagnetic steel plates. The rotor includes a rotation shaft. The plurality of coils are wound around the stator core via an insulating member. While the stator core is formed by joining a plurality of divided cores divided in a circumferential direction, a varnish or an adhesive is applied over the coils and joining portions between the divided cores.

In the present invention according to another aspect, the adhesive has a high thermal conductivity In the present invention according to another aspect, the coils are wound around the respective divided cores.

In the present invention according to another aspect, the stator includes a sensor circuit board including a rotation detecting element of the rotor. The sensor circuit board is fixed via a plurality of fixing pins directly fixed to the stator core.

In the present invention according to another aspect, the fixing pin are fixed across the two adjacent divided cores.

In the present invention according to another aspect, the fixing pins are press-fitted to a disk made of metal disposed on an end surface of the stator core.

In the present invention according to another aspect, each of the divided cores has a shape fixed with an integrally molded resin.

In the present invention according to another aspect, each of the divided cores has a shape fixed with a dust core coating an outer surface thereof.

In the present invention according to another aspect, the respective divided cores are fixed with a tubular fixing member made of metal manufactured by shrinkage fitting or cold fitting.

In the present invention according to another aspect, the respective divided cores have joining portions inclined with respect to an axial direction of the stator core.

In the present invention according to another aspect, the electromagnetic steel plates have a plate thickness of 0.25 mm or less.

Effects of the Invention

According to the present invention, the varnish or the adhesive is applied over the coils and the joining portions of the divided cores, or the joining portions of the divided cores have two different kinds of the shapes so as to alternately mesh with one another, or the abutting portions between the insulating members in the insulating members have convexo-concave shapes alternately meshing with one another. These configurations achieve a high space factor and a low cost by configuring the stator core as the divided structure and also ensure durability and a dust-proof performance.

Additionally, according to the present invention, the plurality of protrusion portions are disposed on the outer surface on the divided core or the plurality of protrusion portions are disposed on the outer periphery of the fixing member to fix the divided cores. These configurations achieve a high space factor and a low cost by configuring the stator core of the brushless motor as the divided structure and also allow improving a cooling performance.

Furthermore, according to the present invention, disconnection of the coil can be preferably reduced.

In addition, according to the present invention, even when the stator core is divided, preferred durability and dust-proof performance can be maintained.

DESCRIPTION OF PREFERRED EMBODIMENTS

The following describes embodiments of the present invention with reference to the drawings.

[Description of Hammer Drill]

Figure 1:
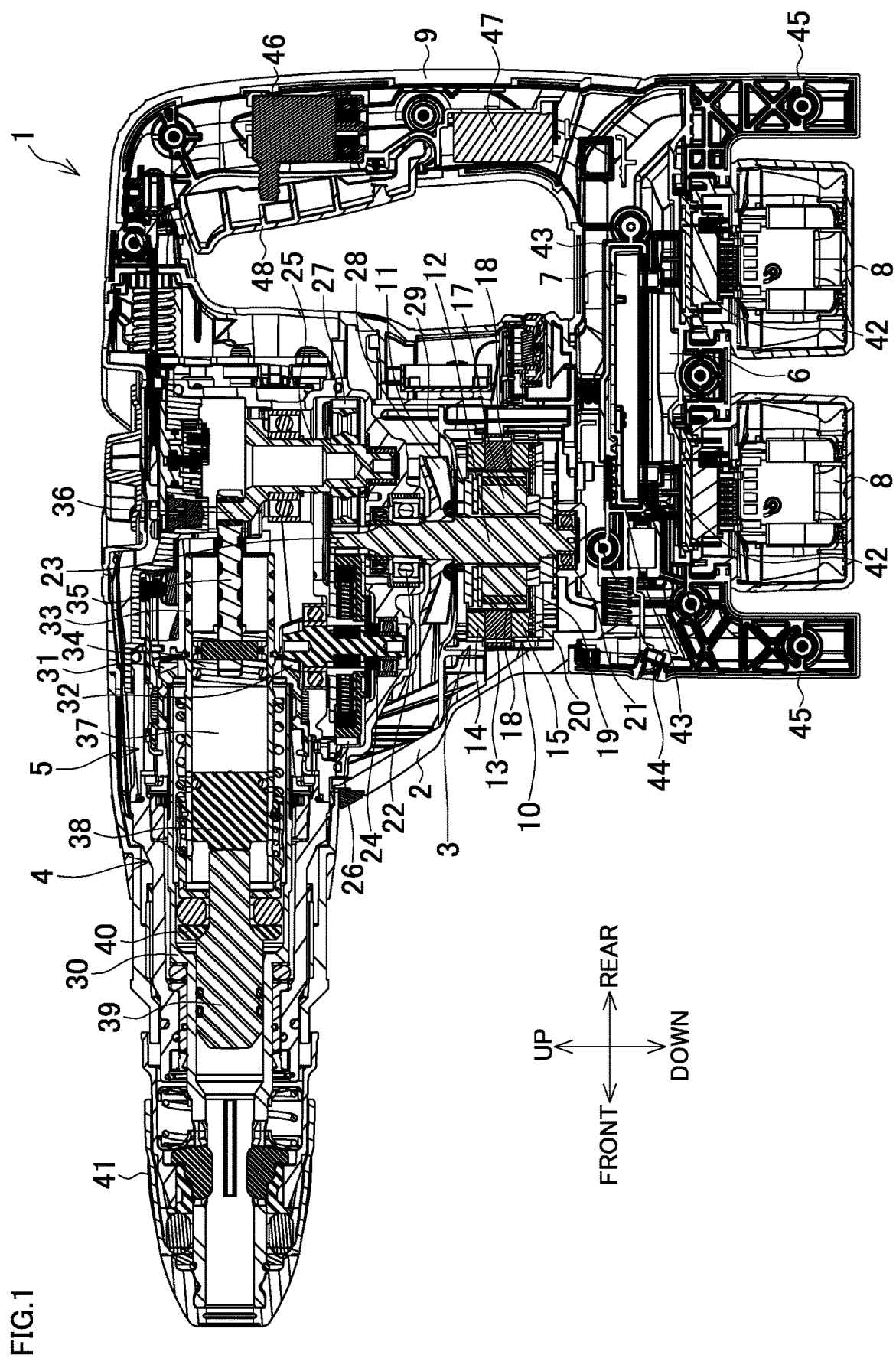
FIG. 1 is a vertical cross-sectional view of a hammer drill.

FIG. 1 is a vertical cross-sectional view of the hammer drill as one example of an electric tool. A hammer drill 1 includes an output housing 4, which houses an output unit 5 and extends forward, on an upper side of a motor housing 2 in an up-down direction housing a brushless motor 3. A battery mounting portion 6 that houses a controller 7 and has a lower side to which two battery packs 8, 8 are mountable is disposed on the lower side of the motor housing 2. Reference numeral 9 denotes a handlebar disposed to extend in the up-down direction from the rear of the output housing 4 to the battery mounting portion 6.

The brushless motor 3 is an inner rotor type including a stator 10 and a rotor 11 inside the stator 10 and is housed in the motor housing 2 with a posture in which a rotation shaft 12 of the rotor 11 facing above. The stator 10 includes a stator core 13, an upper insulator 14 and a lower insulator 15, which are disposed on the top and bottom of the stator core 13, and a plurality of coils 16, 16, and so on (FIG. 2 and the like) wound around the inside of the stator core 13 via the upper and lower insulators 14, 15. The stator core 13 has a divided structure constituted of a plurality of components, and details of this divided structure will be described later.

The rotor 11 includes the rotation shaft 12 positioned at its axial center, a tubular rotor core 17 arranged around the rotation shaft 12, and a plurality of permanent magnets 18, 18, and so on arranged inside the rotor core 17. A sensor circuit board 19 and a terminal unit 20 to connect terminals of the coils 16 are fixed to the lower end of the lower insulator 15. The sensor circuit board 19 includes a rotation detecting element (not illustrated) that detects positions of the permanent magnets 18 in the rotor core 17 and outputs a rotation detection signal. The rotation shaft 12 has a lower end supported to a bearing 21, which is disposed on the bottom portion of the motor housing 2, and an upper end supported to a bearing 22, which is disposed in the output housing 4 and projects into the output housing 4. A pinion 23, which is formed on the upper end of the rotation shaft 12, meshes with gear 26, 27, which are disposed on respective intermediate shaft 24 and crankshaft 25 on the front and rear. A centrifugal fan 28 is disposed on the lower side of the bearing 22 and on the rotation shaft 12, and a baffle plate 29 is disposed below the centrifugal fan 28 and inside the motor housing 2.

The output unit 5 includes a rotatable, tubular tool holder 30 extending in a front-rear direction. A bevel gear 31, which is externally mounted to a rear end of the tool holder 30, meshes with a bevel gear 32 disposed on an upper end of the intermediate shaft 24. A cylinder 33 is inserted into and mounted to the inside of the tool holder 30, and a piston 34 disposed inside the cylinder 33 is coupled to a crank pin 36, which is disposed at an eccentric position on the upper end of the crankshaft 25, via a connecting rod 35.

A striker 38 is housed inside the cylinder 33 and ahead of the piston 34 in an air chamber 37 to be movable back and forth, and an impact bolt 39 is housed inside the tool holder 30 ahead of the striker 38 to be movable back and forth. Here, when a tool bit, such as a drill bit, is inserted from a distal end of the tool holder 30, a rear end of the tool bit retreats the impact bolt 39 up to a position where the impact bolt 39 abuts on a receiving ring 40 ahead of the cylinder 33 to cause the rear end to project into the cylinder 33. Reference numeral 41 denotes an operation sleeve externally mounted to a front end of the tool holder 30 for performing attachment and removal operations of the tool bit.

Meanwhile, inside the battery mounting portion 6, two terminal blocks 42, 42 on which the battery packs 8, 8 are slidably mounted from a right-left direction are arranged back and forth, and the controller 7 is housed on the upper side. The controller 7 includes a control circuit board (not illustrated) including a microcomputer and a switching element and is supported by U-shaped ribs 43, 43, which are disposed upright on an inner surface of the battery mounting portion 6, in the front-rear direction. A light 44 that irradiates the front side of the tool holder 30 with an LED is disposed in front of the controller 7. Guard plates 45, 45 to cover the front and rear of the mounted battery packs 8, 8 are formed to project downward on the front and rear of the battery mounting portion 6.

A switch 46 and a capacitor 47 electrically coupled to the controller 7 are disposed in the handlebar 9, and a switch lever 48 is disposed on a plunger projecting forward from the switch 46.

Accordingly, with this hammer drill 1, pushing the switch lever 48 by a hand gripping the handlebar 9 and performing an ON operation on the switch 46 feeds the power from the battery pack 8 to the brushless motor 3 to rotate the rotation shaft 12. That is, the microcomputer in the controller 7 obtains the rotation detection signal indicative of the position of the permanent magnet 18 of the rotor 11 output from the rotation detecting element in the sensor circuit board 19 to obtain the rotating state of the rotor 11. According to the obtained rotating state, the microcomputer controls ON/OFF of the respective switching elements and flows a current in sequence to the respective coils 16 in the stator 10 in order to rotate the rotor 11.

Thus rotating the rotation shaft 12 decelerates and rotates the intermediate shaft 24 via the gear 26 and rotates the tool holder 30 together with the tool bit via the bevel gears 32, 31. Simultaneously, the crankshaft 25 decelerates and rotates via the gear 27, the piston 34 reciprocates inside the cylinder 33 via the connecting rod 35 to move the striker 38 back and forth via the air chamber 37. Accordingly, the striker 38 hits the tool bit via the impact bolt 39.

Air inlets (not illustrated) are formed on right and left side surfaces of the battery mounting portion 6, which serve as both right and left sides of the controller 7. Exhaust outlets (not illustrated) are formed on right and left side surfaces of the motor housing 2, which serve as both right and left sides of the centrifugal fan 28, and the controller 7 is arranged between the air inlets and the brushless motor 3. Accordingly, by the rotation of the centrifugal fan 28 in association with the rotation of the rotation shaft 12, air suctioned from the air inlets first contacts the controller 7 to cool the controller 7, and after that, the air pass through the inside of the motor housing 2 to cool the brushless motor 3. The air is then discharged from the exhaust outlets via the baffle plate 29.

[Description of Structure of Stator]

Figure 2:
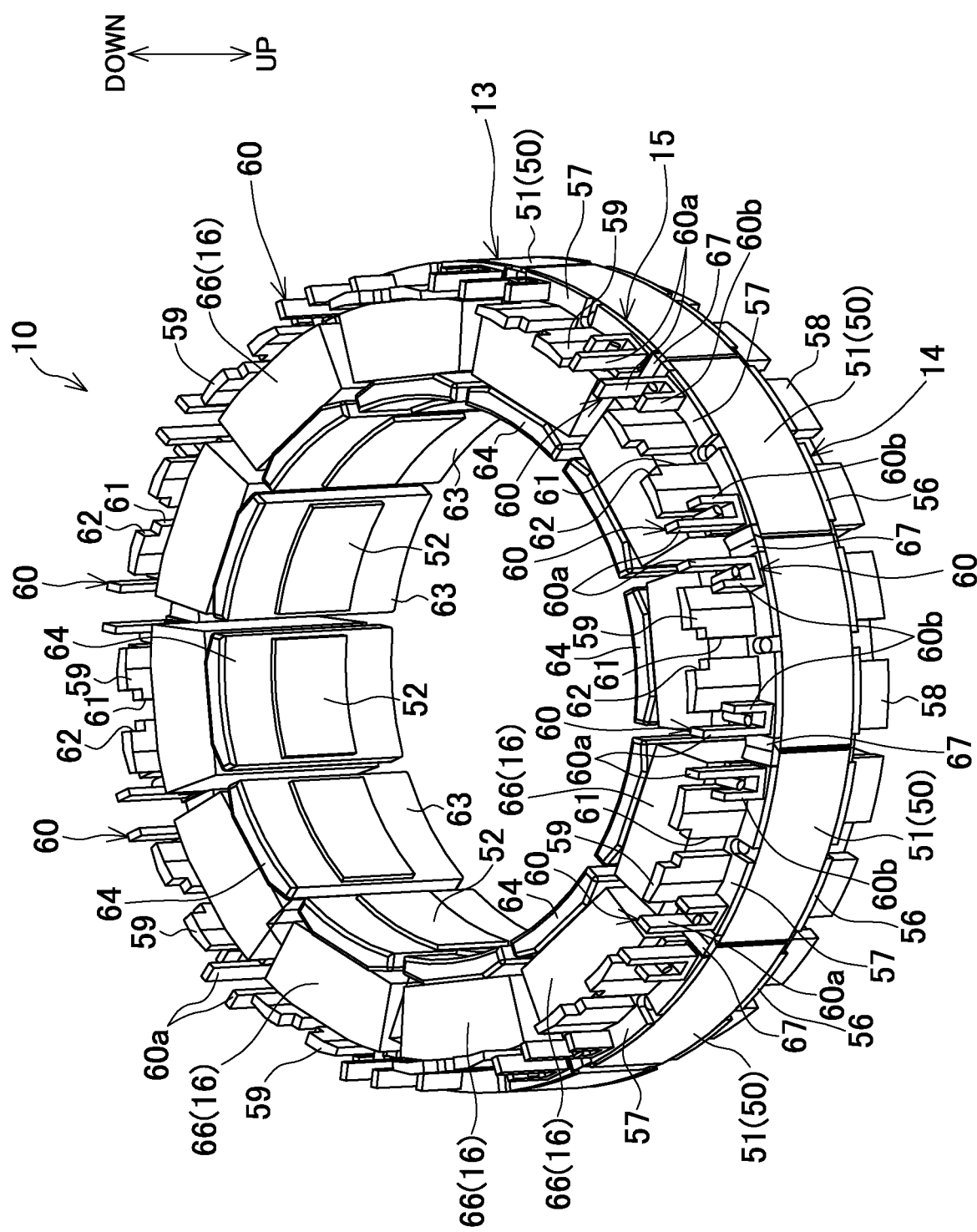
FIG. 2 is a perspective view of a stator from a lower side.
Figure 3:
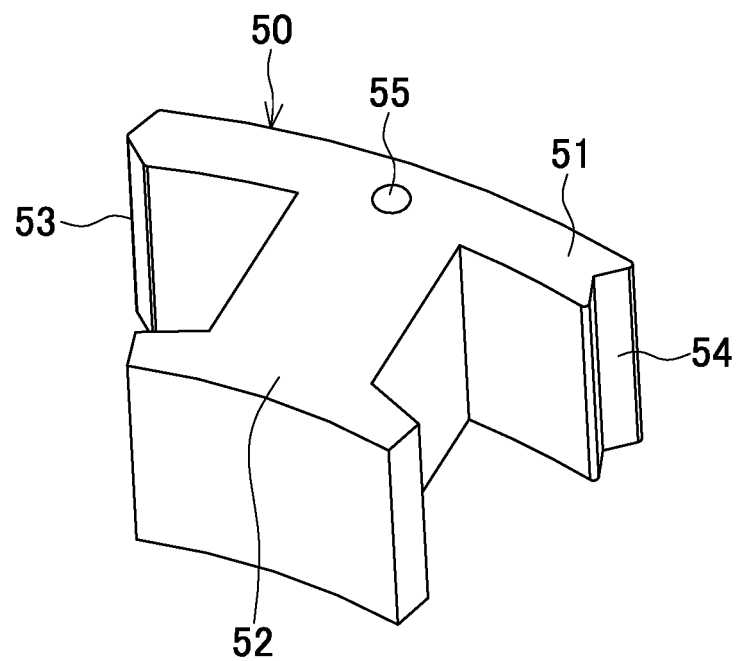
FIG. 3 is a perspective view of a divided core.

Next, the following describes the structure of the stator 10 in detail. FIG. 2 is a perspective view of the stator 10 before the sensor circuit board 19 and the terminal unit 20 are mounted, FIG. 2 is upside down of FIG. 1. The stator core 13 has a tubular body including a plurality (here, 12 pieces) of teeth 52, 52, and so on having a T shape in plan view and projecting toward the center on an inner periphery of the stator core 13. Here, as illustrated in FIG. 3, the stator core 13 is divided by 12 pieces of divided cores 50, 50, and so on formed of arc portions 51 as a part of the tubular body and the teeth 52 projecting inward from inner surfaces of arc portions 51, thus forming the stator core 13 by joining the divided cores 50, 50 adjacent in the circumferential direction. On both ends of the arc portions 51 serving as joining portions of the divided cores 50, 50, protruding portions 53 projecting into a triangular shape in plan view and depressed portions 54 depressed into a V shape in plan view are each formed on one ends and the other ends across the whole length in the up-down direction. The protruding portion 53 and the depressed portion 54 have shapes fittable to one another. A through-hole 55 penetrating up and down is formed at the center in the circumferential direction of the arc portion 51.

Electromagnetic steel plates (for example, a plate thickness t=0.25 mm or less) punched into an identical shape are laminated and integrally molded with resin, thus manufacturing the divided cores 50. The use of the electromagnetic steel plates having the thin plate thickness leads to a reduction in loss due to eddy current.

Figure 4A:
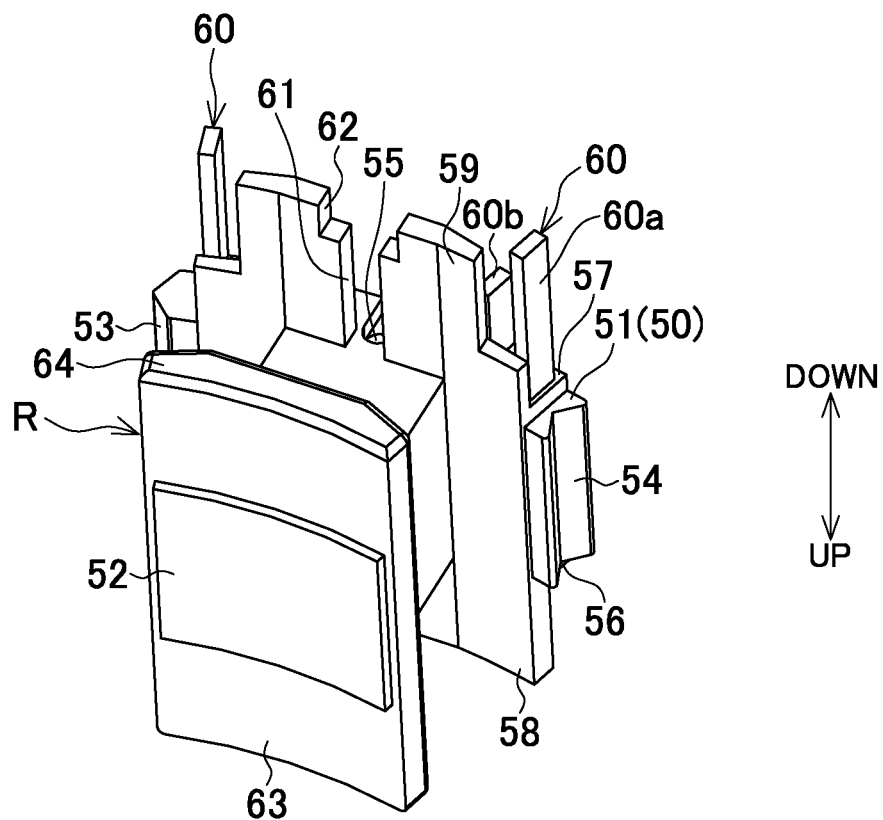
FIG. 4A is a perspective view of the divided core in which a resin molded portion is formed.

As illustrated in FIG. 4A, an integrally molded resin molded portion R having a predetermined thickness coats an outer periphery of the divided core 50 excluding parts of the protruding portion 53 and the depressed portion 54 on both ends of the arc portion 51, the projecting end of the tooth 52, and the through-hole 55. However, insulation papers (not illustrated) are interposed inside the resin molded portion R on both right and left surfaces of the tooth 52 in the circumferential direction, thus double insulations are provided.

In this resin molded portion R, a part positioned on the top side of the arc portion 51 becomes an upper insulating portion 56 constituting the upper insulator 14 and a part positioned on the bottom side of the arc portion 51 becomes a lower insulating portion 57 constituting the lower insulator 15. That is, the upper and lower insulators 14, 15 are divided into twelve pieces, similarly to the stator core 13.

An upper outer rib 58 and a lower outer rib 59 to receive the outer side of the coil 16 are disposed upright on inner edges on the tooth 52 side of the upper and lower insulating portions 56, 57, respectively, and a pair of terminal plates 60, 60 are disposed outside the lower outer rib 59. This terminal plates 60 have a U-shape with both ends facing downward, and end portions 60a on both ends sides of the arc portions 51 are formed longer so as to extend downward with respect to end portions 60b inside the end portions 60a. Furthermore, a slit 61 opening downward is formed at the center of the lower outer rib 59, and an expansion portion 62 having a widening width is formed on the lower side of the slit 61. An upper inner rib 63 and a lower inner rib 64 to receive the inside of the coil 16 are each disposed upright on the top and bottom of the projecting end of the tooth 52 in the resin molded portion R.

Figure 4B:
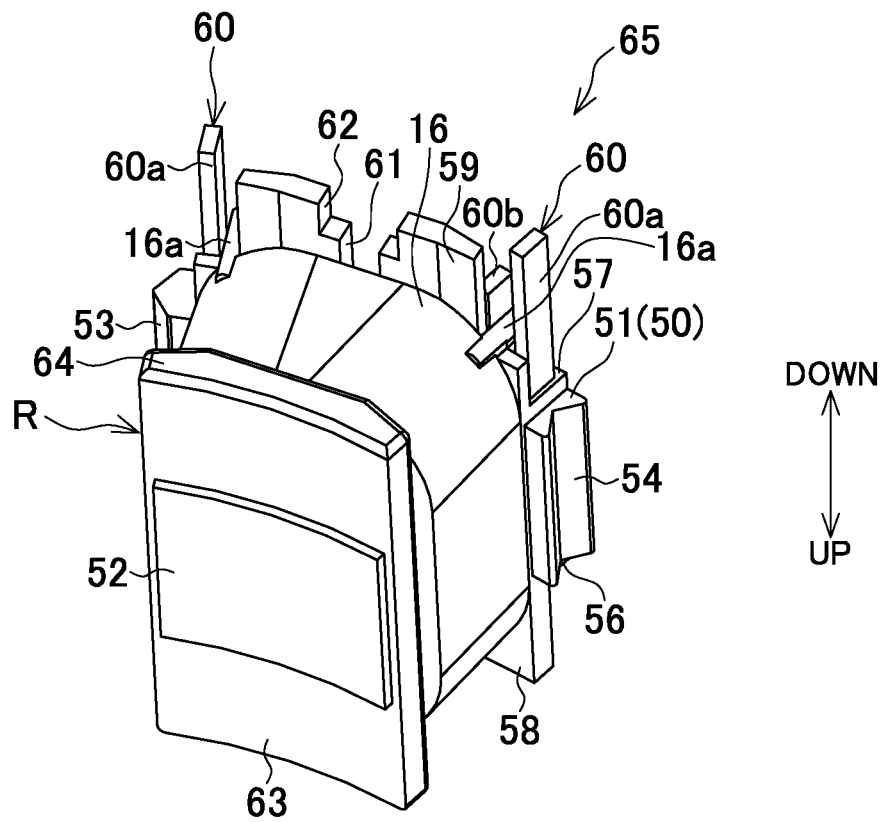
FIG. 4B is a perspective view of a divided body.

In the divided core 50 thus integrally molded with resin, a magnet wire is wound around to each tooth 52 to form the coil 16. After both terminals 16a, 16a of the coil 16 are pulled out from both sides of the lower insulating portions 57 and pressure shaping is performed on the coil 16, both terminals 16a, 16a are coupled to the right and left terminal plates 60, 60 by fusing, soldering, or the like. Then, as illustrated in FIG. 4B, the coil 16 is wound around the divided core 50 via the upper and lower insulating portions 56, 57, and the divided body 65 in which the terminals 16a, 16a are fixed to the terminal plates 60, 60 are obtained.

Thus, the shape of each divided core 50 is fixed with the resin molded portion R coating the outer surface of the divided core 50. Therefore, the divided core 50 is insulated at the same time together with the integration of the electromagnetic steel plates. Since the coil 16 is formed on each divided core 50, the magnet wire can be easily wound at identical timing.

Figure 5:
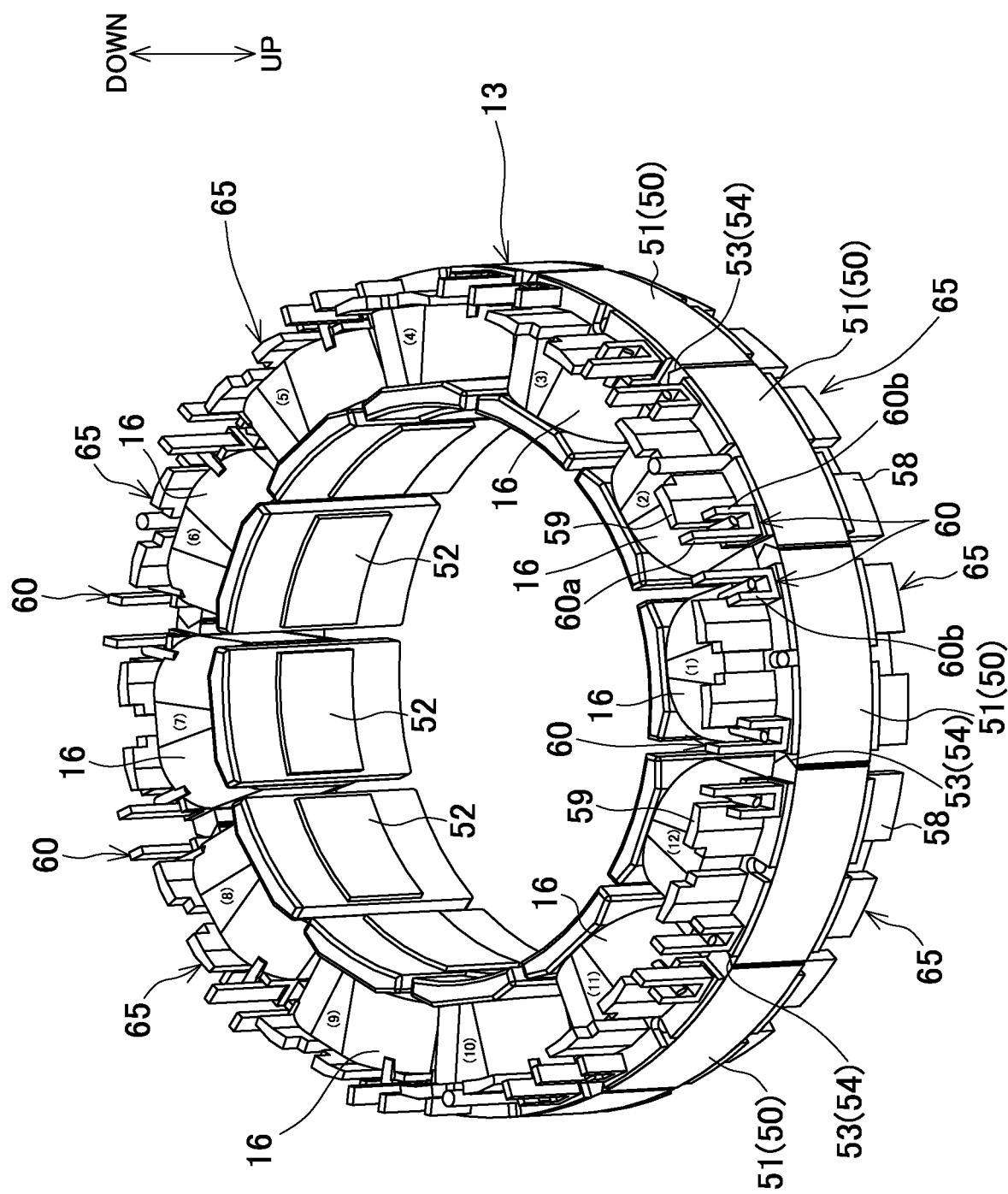
FIG. 5 is a perspective view of the stator from the lower side before coated with varnish.

Twelve pieces of the divided bodies 65 are circumferentially arranged such that the arc portions 51 of the respective divided cores 50 are circumferentially coupled, and the adjacent protruding portions 53 and depressed portions 54 are fitted to one another and joined by welding or the like. Then, as illustrated in FIG. 5, the respective divided bodies 65, 65, and so on are circumferentially coupled. In this state, applying varnishes 66, 67 over the outer peripheral surfaces of the respective coils 16 and the joining parts of the divided cores 50, 50 (both upper and lower ends of the fitting parts between the protruding portions 53 and the depressed portions 54) allows obtaining the stator 10 illustrated in FIG. 2. The varnishes 66, 67 are to insulate and protect the coils 16 and may be adhesives, and especially, applying the adhesives over the joining parts of the divided cores 50, 50 allows expecting improvement in strength. The use of an adhesive having a high thermal conductivity (for example, a resin adhesive mainly containing epoxy resin) facilitates releasing heat generated in the coils 16 and improves heat resistance performance.

Figure 6:
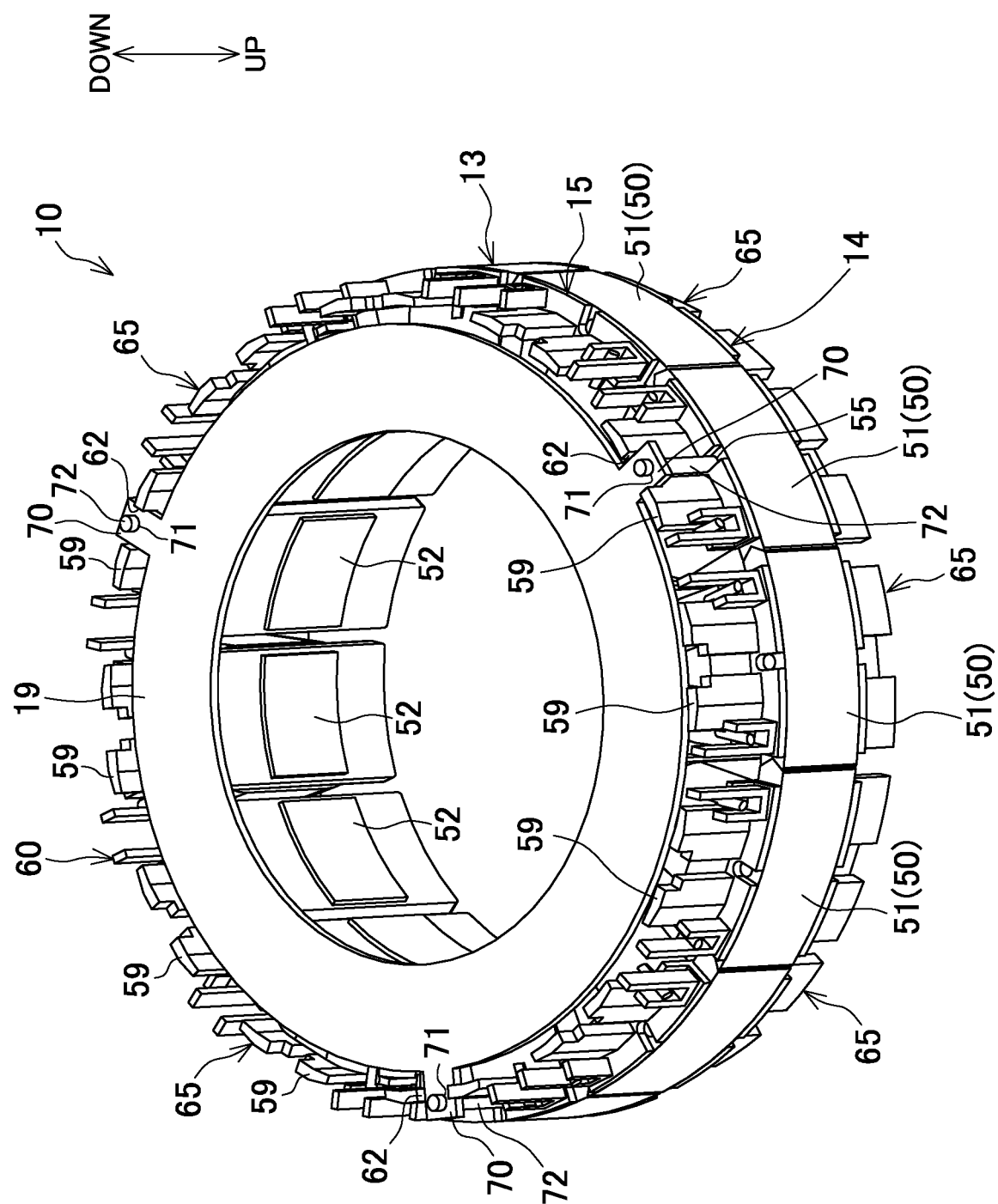
FIG. 6 is a perspective view of the stator from the lower side to which a sensor circuit board is mounted.

As illustrated in FIG. 6, the sensor circuit board 19 is mounted on the lower insulator 15 of the stator 10. The sensor circuit board 19 has an outer diameter such that the sensor circuit board 19 can be housed in an inner space surrounded by the respective lower outer ribs 59 on the lower insulator 15, has a ring shape having a through-hole for the rotor 11 at the center, and has an outer periphery on which three installation pieces 70, 70, and so on radially protrude at regular intervals in the circumferential direction. This installation piece 70 engages the expansion portions 62 of the slits 61 and projects outward with respect to the lower outer rib 59 at the corresponding position, and a fixing pin 72 is press-fitted between a through hole 71 disposed at the distal end and the through-hole 55 in the divided core 50 positioned immediately below the through hole 71. Thus, the sensor circuit board 19 is supported to the divided cores 50 via the fixing pins 72, 72, and so on.

[Effects Brought by Fixing Structure of Sensor Circuit Board with Fixing Pins]

Thus, the sensor circuit board 19 is fixed via the plurality of fixing pins 72, 72, and so on directly fixed to the stator core 13. Accordingly, the sensor circuit board 19 can be positioned with respect to the stator core 13 without via the lower insulator 15 made of resin having low accuracy. Accordingly, the rotation position of the rotor 11 can be accurately detected, controllability is improved, and a permanent magnet for detection of the rotation becomes unnecessary.

Figure 7:
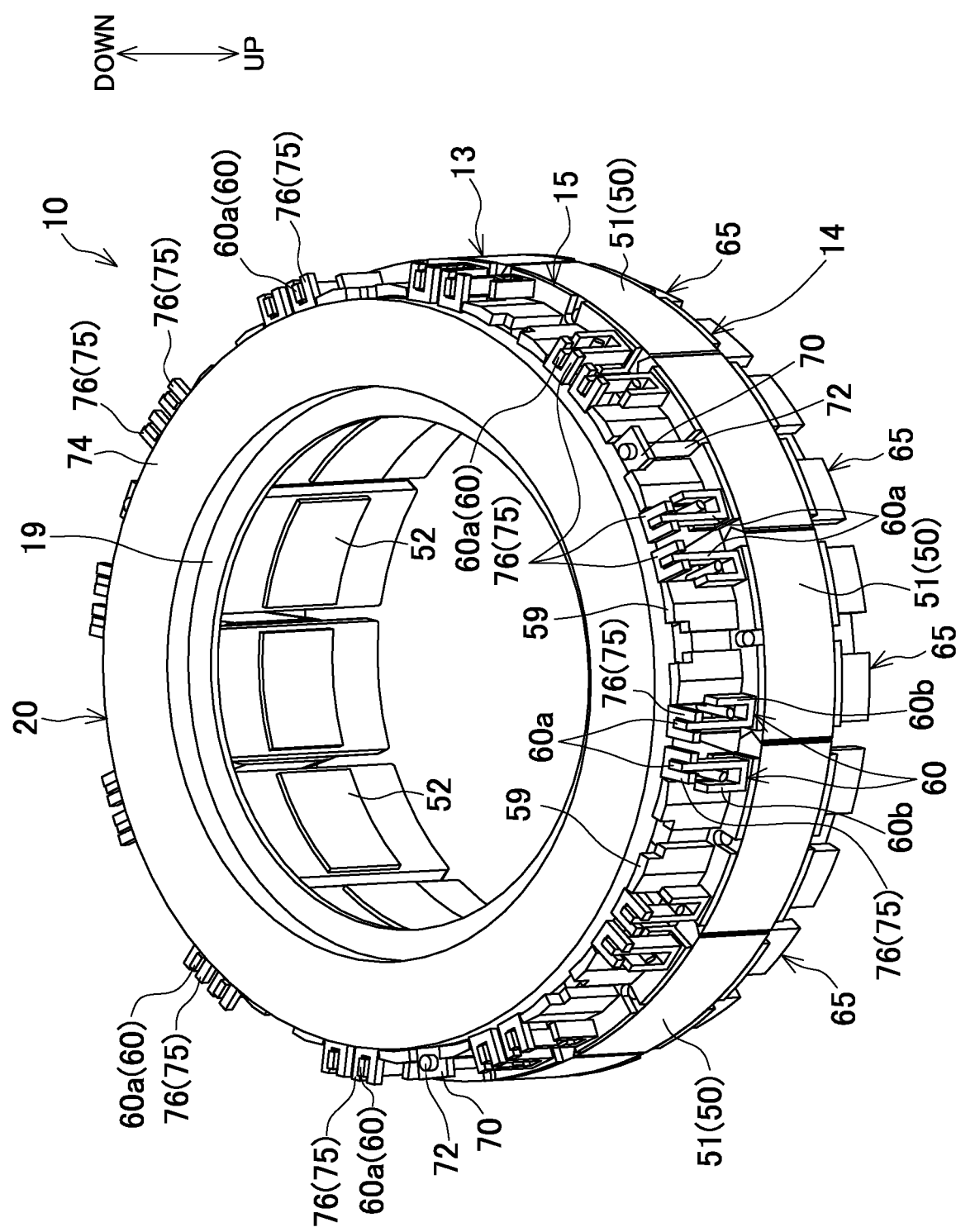
FIG. 7 is a perspective view of the stator from the lower side to which a terminal unit is mounted.

As illustrated in FIG. 7, by insert-molding a plurality of terminal metal fittings with resin, the terminal unit 20 has a structure in which bifurcated end portions 76, 76, and so on of terminal metal fittings 75, 75, and so on project so as to match positions of the terminal plates 60, 60 of the respective divided bodies 65 on an outer periphery of an insulating ring 74, which has a diameter approximately identical to that of the sensor circuit board 19 and has a through-hole for the rotor 11 at the center. The longer end portions 60a of the corresponding terminal plates 60 are inserted into the respective bifurcated end portions 76 and coupled by soldering or the like, thus mounting to the stator 10 is performed. Changing the shapes of the terminal metal fittings 75 and the disposed configuration in the insulating ring 74 makes the connection pattern of the coils 16 selectable. Coupling that the adjacent divided bodies 65, 65 are reversely wound also becomes possible.

Figure 8A:
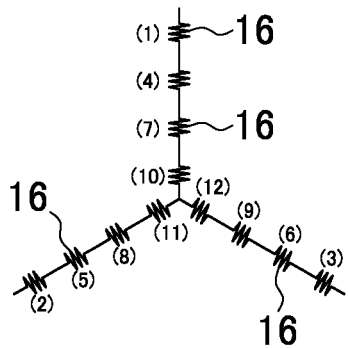
FIGS. 8A to 8F are explanatory views of connection patterns.
Figure 8D:
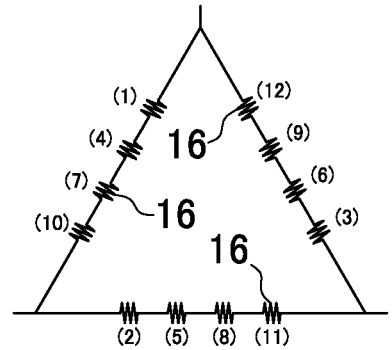
Figure 8B:
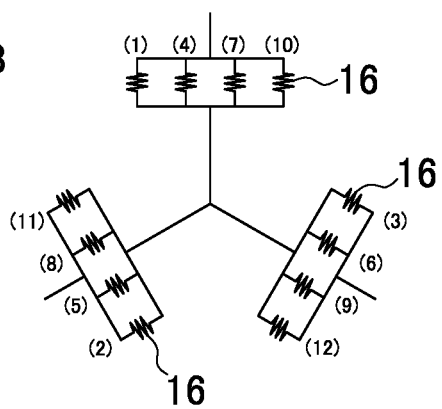
Figure 8E:
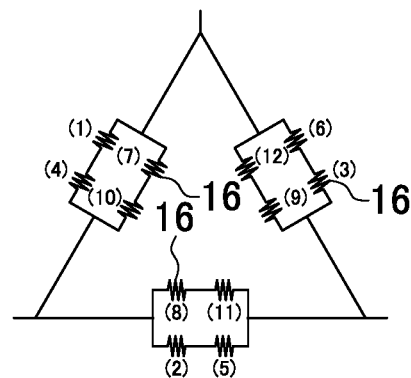
Figure 8C:
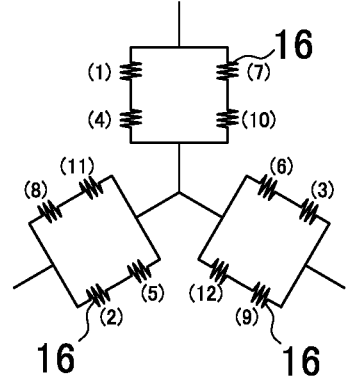
Figure 8F:
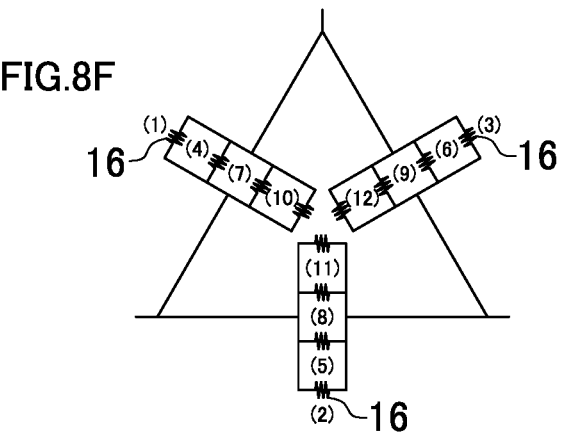

FIG. 8 illustrates examples of the connection patterns of 12 pieces of the coils 16, 16 . . . , and so on distinguished by numbers (1) to (12) in FIG. 5, FIG. 8A illustrates a Star (Y) connection of four series, FIG. 8B illustrates a Star (Y) connection of four parallel, FIG. 8C illustrates a Star (Y)-connection of two series and two parallel, FIG. 8D illustrates a Delta (Δ) connection of four series, FIG. 8E illustrates a Delta (Δ)-connection of two series and two parallel, and FIG. 8F illustrates a Delta (Δ) connection of four parallel.

Figure 9:
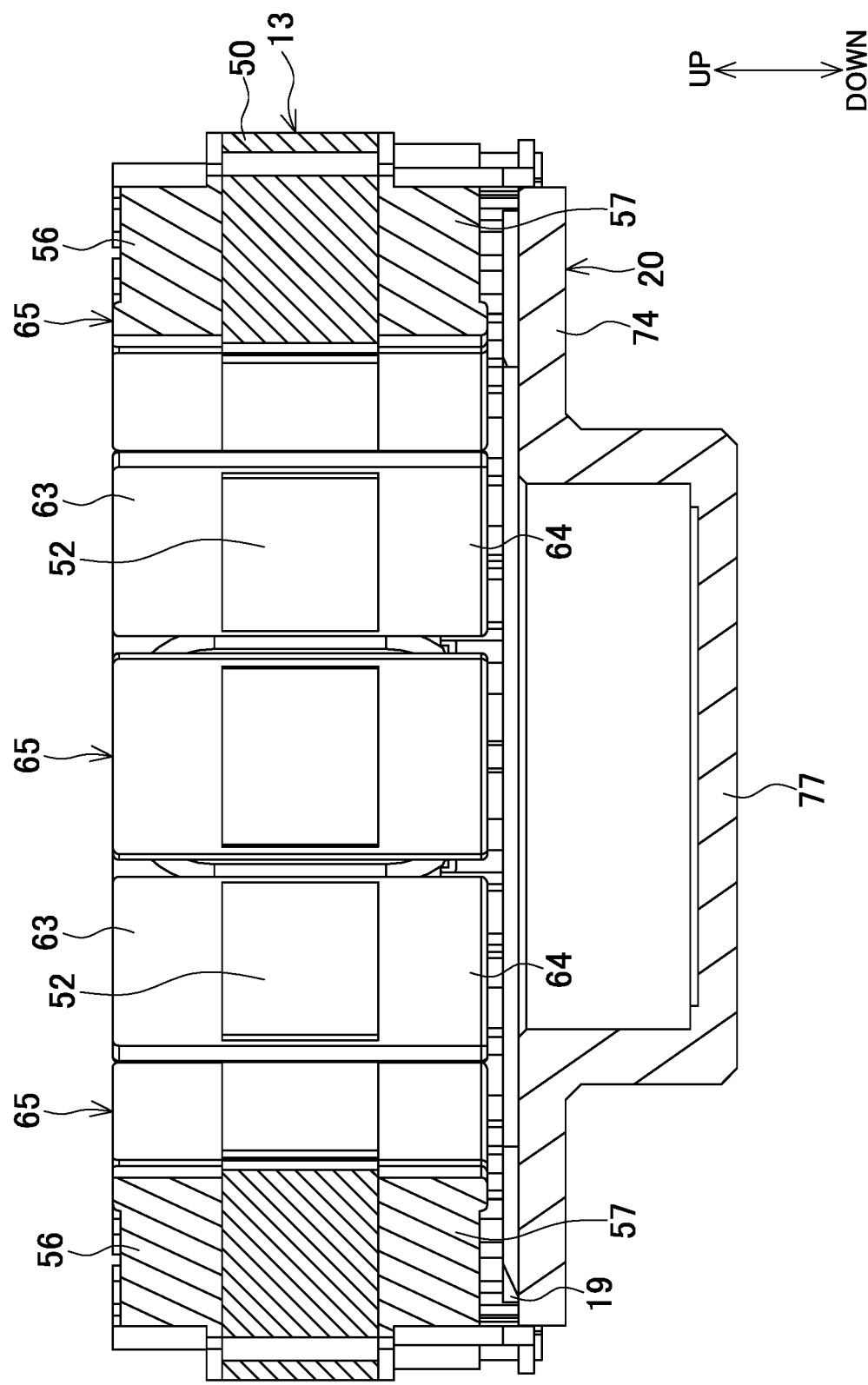
FIG. 9 is a vertical cross-sectional view of a stator illustrating a modification example of the terminal unit.

As illustrated in FIG. 9, the terminal unit 20 may integrally include a bearing holder 77 that holds the bearing 21 of the rotation shaft 12. Disposing the holding portion for the bearing 21 in the motor housing 2 likely causes a cumulative tolerance, and the use of the divided cores 50 likely causes a difficulty of ensuring the coaxiality between the stator 10 and the rotor 11. However, supporting the rotation shaft 12 with the bearing holder 77 via the bearing 21 using the terminal unit 20 facilitates providing the coaxiality between the stator 10 and the rotor 11.

[Effects Brought by Varnish or Adhesive]

With the stator 10, while the stator core 13 is formed by joining the plurality of divided cores 50, 50, and so on, which are divided in the circumferential direction, applying the varnish or the adhesive over the respective coils 16 and the joining portions between the divided cores 50, 50 increases integrity and adhesiveness. Accordingly, while the stator core 13 is configured as the divided structure to achieve a high space factor and a low cost, durability and a dust-proof performance can be ensured.

Moreover, in the application of the adhesive, the use of an adhesive having a high thermal conductivity facilitates releasing the heat in the coils 16 to the stator 10, thus improving heat resistance.

Meanwhile, the use of the divided cores 50 possibly generates a chattering sound caused by an electromagnetic force generated between the divided cores 50, 50 during switching of excitation. However, applying the varnish or the adhesive over the respective coils 16 and the joining portions between the divided cores 50, 50 increases integrity and adhesiveness. Therefore, a reduction effect of the chattering sound can be expected.

[Effects Brought by Two Terminals Disposed on Each Coil]

With the stator 10, since the two terminal plates 60, 60 coupled to the magnet wire forming the coil 16 are disposed on each coil 16, the magnet wire can be coupled to the terminal plates 60, 60 with tension applied to the coil 16.

Accordingly, there is no possibility of causing a looseness and a deflection in the coil 16, and a disconnection and a layer short are reduced.

Therefore, the present invention is also usable for a stator in which a stator core is not divided.

[Effects Brought by Terminal Unit]

Here, the stator 10 includes the terminal unit 20 including the plurality of terminal metal fittings 75, 75, and so on to couple the predetermined terminal plates 60, 60 to one another, and the coupling between the terminal metal fittings 75 on the terminal unit 20 and the terminal plates 60 connects the respective coils 16. That is, after a plurality of the terminal units 20 having the terminal metal fittings 75 different in the shapes and the disposed configuration are prepared, the respective coils 16 are wound around the stator cores 13, and the respective magnet wires are coupled to the terminal plates 60, any of the terminal units 20 is selected and fixed to the stator 10. Then, the terminal metal fittings 75 on the terminal unit 20 and the terminal plates 60 are coupled, and the respective coils 16 can be connected via the terminal unit 20. Accordingly, the use of the terminal unit 20 according to the purpose allows easily selecting the series, parallel, Y-connection, and the Δ connection as illustrated in FIG. 8. Thus, since only the change of the terminal unit 20 can change the connection method, optimal winding wire specifications of a manufacturing period (number of turnings) and manufacturability (wire diameter) are selectable according to the respective manufacturing specifications using the identical winding wire facility.

Accordingly, the present invention according to the terminal unit is also usable for a stator in which a stator core is not divided.

With the terminal unit 20, coupling a starting end of a magnet wire of one coil 16 and a terminating end of a magnet wire of another coil 16 adjacent to one another in the identical phase allows producing the divided bodies 65 using the identical winding wire facility even when a fractional slot is used.

[Modification Example of Divided Cores (Shapes of Joining Portions Alternately Different)]

Figure 10A:
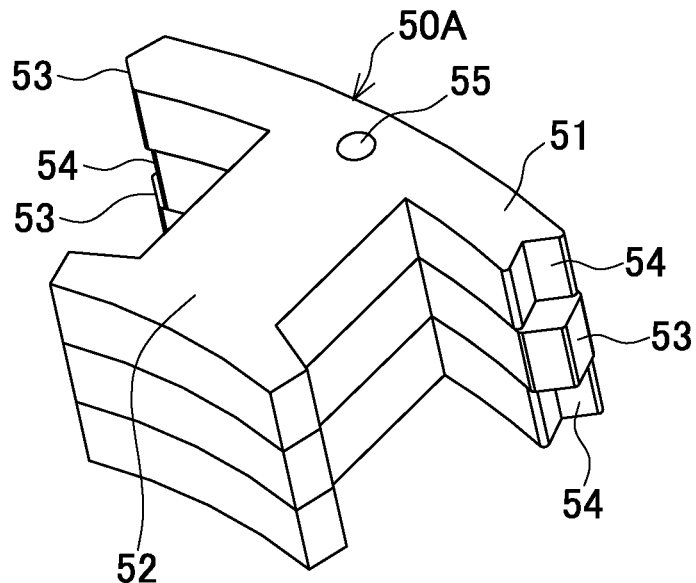
FIG. 10A is a perspective view illustrating a modification example of the divided core.

Like a divided core 50A illustrated in FIG. 10A, the divided core may include the arc portion 51 having the protruding portions 53 and the depressed portions 54 on both ends in the circumferential direction. The protruding portions 53 and the depressed portions 54 may have convexo-concave shapes of two different kinds of shapes appearing in alternation such that the adjacent divided cores 50A, 50A alternately mesh with one another.

The convexo-concave shapes can be formed by stacking electromagnetic steel plates having different both end shapes in which one end portion of the arc portion 51 is configured to be a protruding shape and the other end portion is configured to be a depressed shape while changing orientations by every predetermined number of plates.

Figure 10B:
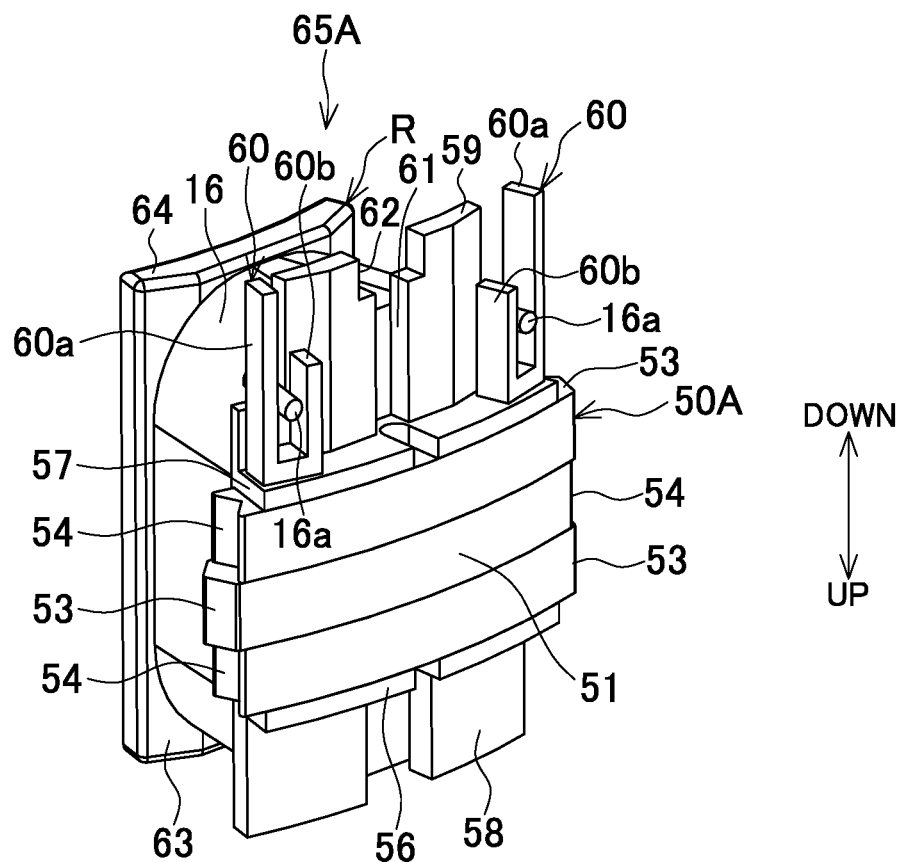
FIG. 10B is a perspective view of a divided body.

On this divided core 50A, the resin molded portion R including the upper insulating portion 56 and the lower insulating portion 57, the upper and lower outer ribs 58, 59, and the like is formed with resin similarly, the coil 16 is wound around, and both terminals 16a, 16a are electrically coupled to the terminal plates 60, 60. Then, as illustrated in FIG. 10B, a divided body 65A including the arc portion 51 of the divided core 50A having both ends in the circumferential direction exposed as the convexo-concave shapes is obtained.

Twelve pieces of the divided bodies 65A, 65A, and so on are arranged in the circumferential direction such that the arc portions 51 of the respective divided cores 50A are coupled in the circumferential direction, and the protruding portions 53 and the depressed portions 54 are alternately fitted and are joined by welding or the like. Then, similarly to FIG. 5, the respective divided bodies 65A, 65A, and so on are in the state of being coupled in the circumferential direction. In this state, applying the varnishes 66, 67 over the outer peripheral surfaces of the respective coils 16 and the joining parts between the divided cores 50A, 50A obtains the stator 10 similar to FIG. 2. It is only necessary to similarly fix the sensor circuit board 19 and the terminal unit 20.

[Effects Brought by Shapes of Joining Portions Alternately Different]

Thus, the end portions of the joining portions between the divided cores 50A, 50A in the respective divided cores 50A are configured such that the protruding portions 53 and the depressed portions 54 having the two different shapes appear in alternation. Accordingly, the end portions mesh with one another with the divided cores 50A, 50A in the joined state, thereby allowing ensuring strength and adhesiveness in a thrust direction. Accordingly, while the stator core 13 is configured as the divided structure to achieve the high space factor and the low cost, durability and a dust-proof performance can be ensured.

It should be noted that, not limited to the triangular-shaped protruding portion 53 and the V-shaped depressed portion 54, as long as meshing is possible with two different shapes, the shapes of the end portions are appropriately changeable, such as fitting of semicircular-shaped convex portion and concave portion and a protruding portion and a depressed portion literally. The same applies to the divided core 50 illustrated in FIG. 3, and the shapes are appropriately changeable not limited to the protruding portion 53 and the depressed portion 54.

[Modification Example of Divided Cores (Shapes of Insulating Portions Alternately Different)]

Figure 11A:
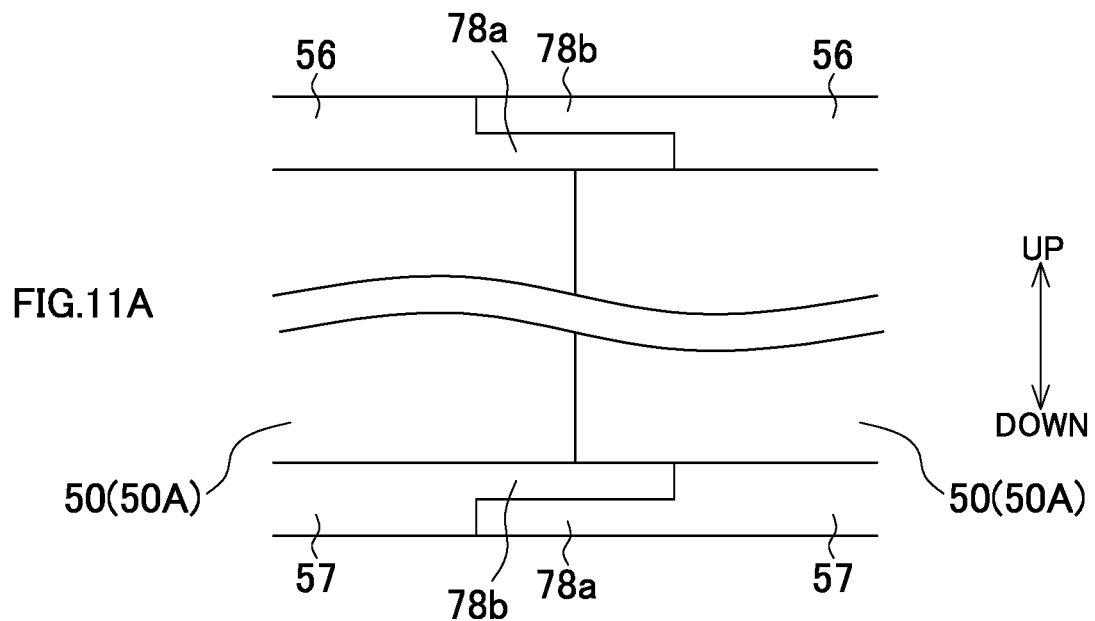
FIGS. 11A and 11B are explanatory views illustrating modification examples of upper and lower insulating portions.

Such structures that are alternately different are applicable to the upper and lower insulating portions 56, 57. For example, as illustrated in FIG. 11A, the upper insulating portion 56 in one divided core 50 (50A) is configured as an uneven portion 78a having a lower side extending to the adjacent divided cores 50 (50A) side and an upper side retreating to a side of itself, and the upper insulating portion 56 in another divided core 50 (50A) is configured as a reversed uneven portion 78b having an upper side extending to the adjacent divided core side and a lower side retreating to the side of itself. In this case as well, the uneven portions 78a, 78b alternately mesh with one another in the joined state. The same applies to the lower insulating portion 57.

[Effects Brought by Shapes of Insulating Portions Alternately Different]

Thus, when the respective upper and lower insulating portions 56, 57 are divided similarly to the divided cores 50 (50A) and arranged on the respective divided cores 50 (50A), and abutting portions between the upper insulating portions 56, 56 and between the lower insulating portions 57, 57 are configured to have convexo-concave shapes alternately meshing with one another, an insulation distance can be ensured long. While the stator core 13 is configured as the divided structure to achieve the high space factor and the low cost, the integrated upper and lower insulating portions 56, 57 allows enhancing the strength in the thrust direction and ensuring durability and a dust-proof performance.

Figure 11B:
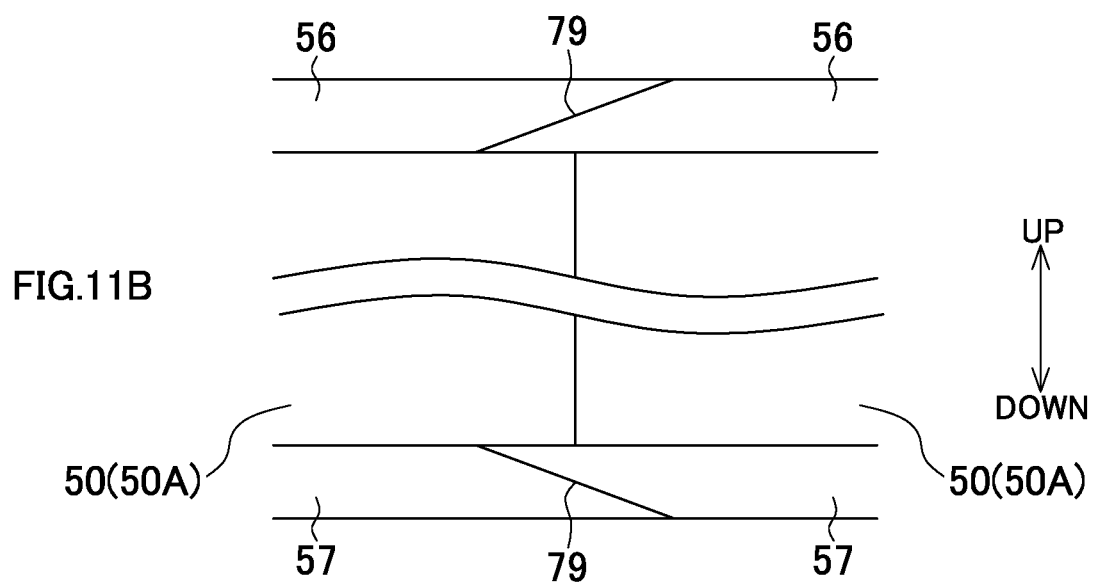

It should be noted that the convexo-concave shapes are not limited to these shapes, the numbers of depressed portions and protruding portions may be increased, and not limited to the convexo-concave shapes, as illustrated in FIG. 11B, inclined surfaces 79, 79 can abut on one another.

[Modification Example of Divided Cores (Fixing Pin is Doubled)]

Figure 12A:
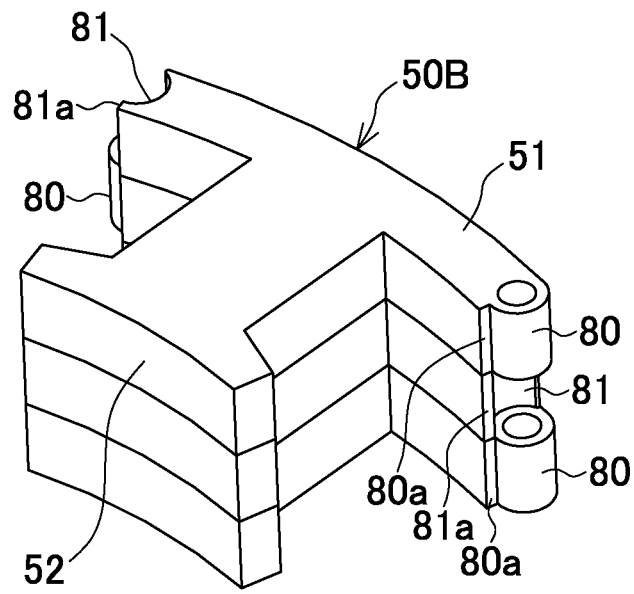
FIG. 12A is a perspective view illustrating a modification example of the divided core.

Like a divided core 50B illustrated in FIG. 12A, tubular hinge portions 80 and concave surface portions 81 to which the hinge portions 80 are fitted are formed in alternation on both ends of the arc portion 51 such that the hinge portions 80, 80 coaxially overlap in alternation between end portions of the arc portions 51 on the adjacent divided cores 50B, 50B.

Similarly to the divided cores 50A, the hinge portions 80 and the concave surface portions 81 can be formed by stacking electromagnetic steel plates having different both end shapes in which one end portions are configured to be ring shapes as a part of the hinge portions 80 and the other end portions are configured to be concave shapes as a part of the concave surface portions 81 while changing orientations by every predetermined number of plates.

Figure 12B:
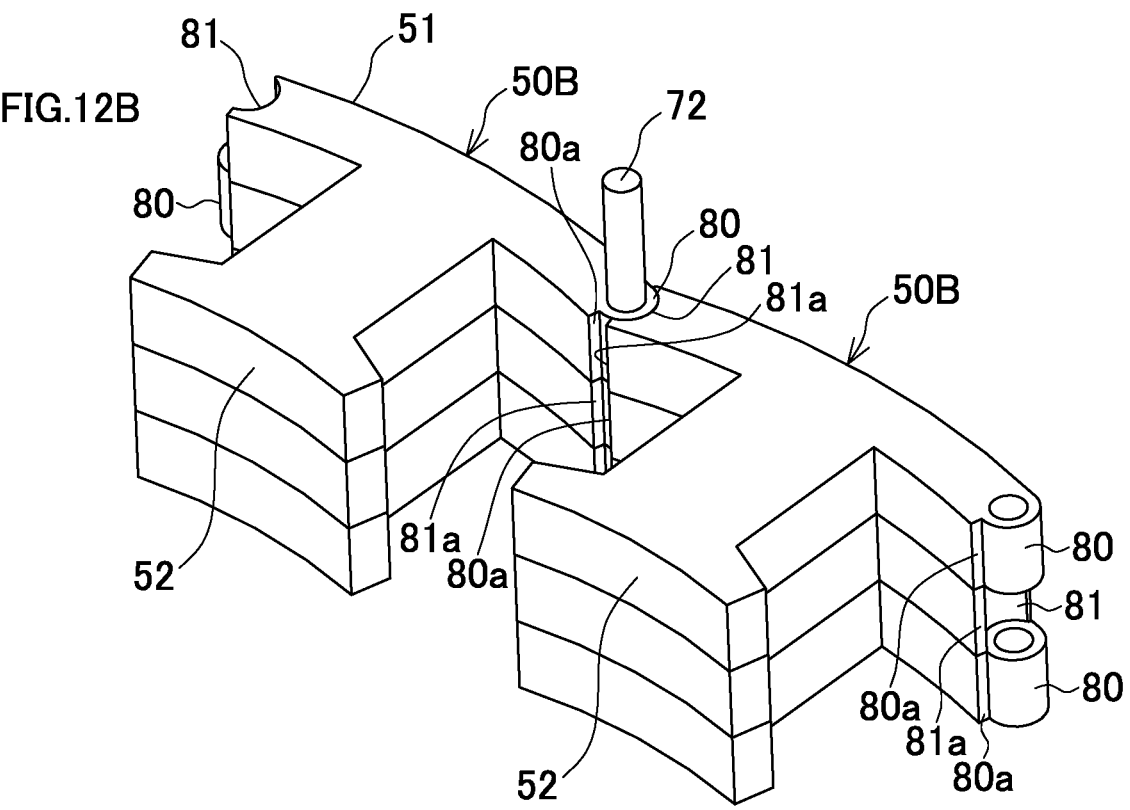
FIG. 12B is a perspective view illustrating a coupled state with a fixing pin.

As illustrated in FIG. 12B, penetrating the fixing pin 72 for the sensor circuit board 19 across the hinge portions 80, 80 coaxially positioned between the adjacent divided cores 50B, 50B allows joining between the divided cores 50B, 50B.

Figure 13:
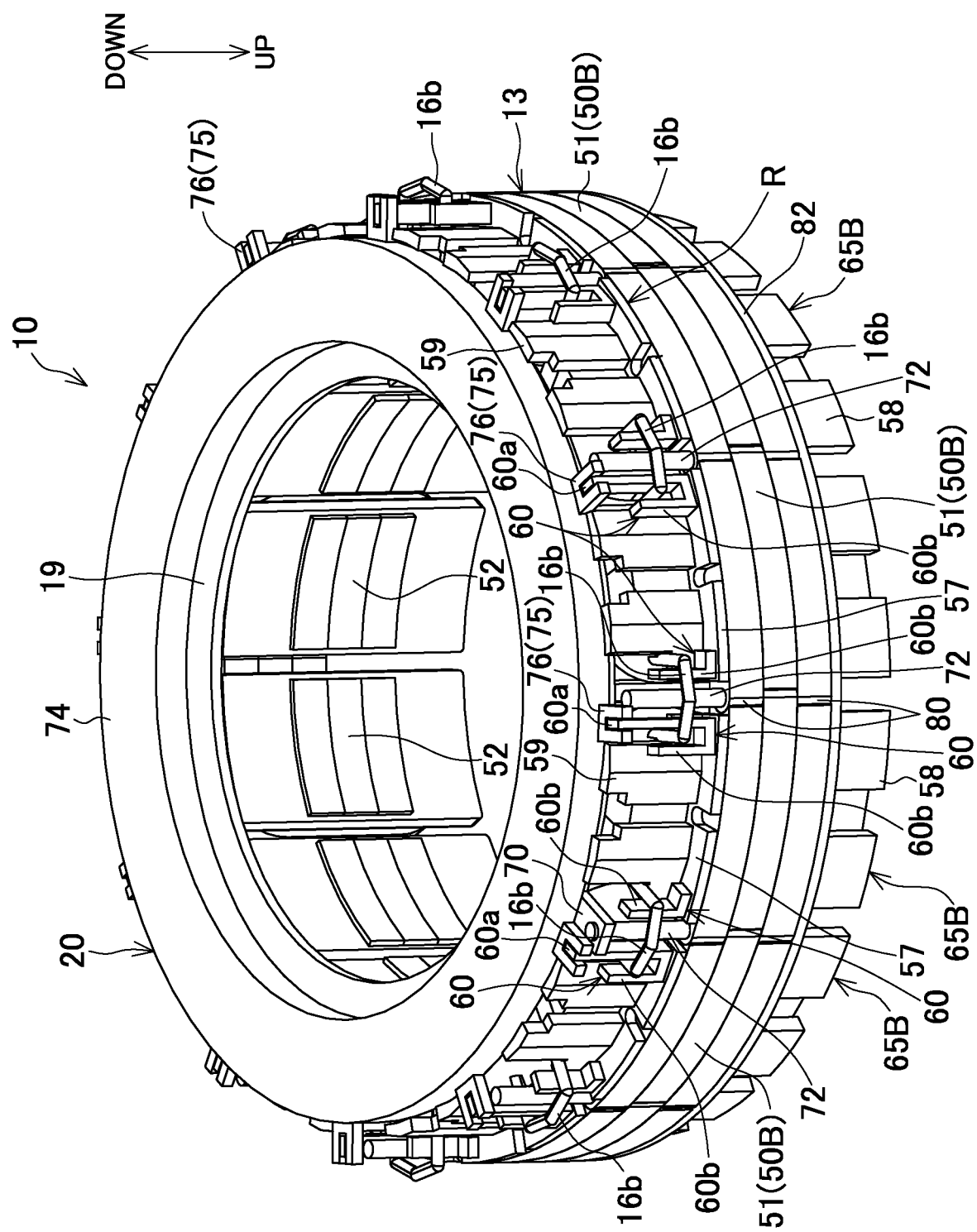
FIG. 13 is a perspective view of the stator from a lower side in which the fixing pins double as mounting of the sensor circuit board and joining of the divided cores.

In this case, it is sufficient that the fixing pins 72, 72 are extended long downward, as illustrated in FIG. 13, the respective installation pieces 70 on the sensor circuit board 19 are positioned between the divided cores 50B, 50B not the expansion portions 62 of the slits 61 on the lower outer ribs 59, the respective fixing pins 72 are inserted into the through holes 71 in the respective installation pieces 70, and the sensor circuit board 19 is mounted.

It should be noted that, in FIG. 13, in a divided body 65B configured by fixing each divided core 50B with the resin molded portion R, one terminal plate 60 disposed on the lower insulating portion 57 has an L shape not having the longer end portion 60a, and the bifurcated end portion 76 of the terminal metal fitting 75 of the terminal unit 20 is electrically coupled to only the longer end portion 60a of the other terminal plate 60. In a state of being coupled with a crossover wire 16b, which meanders the outer side of the fixing pin 72, the coils 16, 16 on the adjacent divided bodies 65B, 65B are electrically coupled and connected to the respective U-shaped terminal plate 60 and L-shaped terminal plate 60, which are adjacent to one another and between which the fixing pin 72 is sandwiched.

[Effects Brought by Doubled Fixing Pin]

Thus fixing the fixing pin 72 across the adjacent two divided cores 50B, 50B allows the fixing pin 72 to double as the coupling between the divided cores 50B, 50B and the mounting of the sensor circuit board 19.

Especially, as in FIG. 12B, in a case where an interval between the divided cores 50B, 50B is expanded in a state of being coupled with the fixing pin 72 and an interval between the teeth 52, 52 is expanded, the coils 16, 16 are easily wound around after the resin molded portions R are formed and can be wound around without cutting the magnet wires, thereby ensuring reducing the number of terminal plates. In a connection structure in FIG. 13, the fixing pins 72 are usable for positioning the crossover wires 16b between the coils 16, 16.

A disk-shaped coupling ring 82 made of metal is disposed outside the upper outer ribs 58 on the end surface of the upper insulator 14, and upper ends of the respective fixing pins 72 are coupled to the coupling ring 82 by press-fitting or the like. In this case, since the fixing pins 72 are integrated with the coupling ring 82, the integrity of the divided cores 50B, 50B, and so on is enhanced.

As in FIG. 12, with the use of the fixing pin 72 for coupling of the divided cores 50B, 50B, in order to avoid the arc portions 51, 51 to mutually turn excessively from positions where the arc portions 51, 51 are continuous in the circumferential direction, stopper surfaces 80a, 81a that abut on one another to restrict the excessive turning are preferably disposed inside the hinge portions 80 and the concave surface portion 81.

[Modification Example of Divided Cores (Fixation and Heat Release Structure)]

Figure 14:
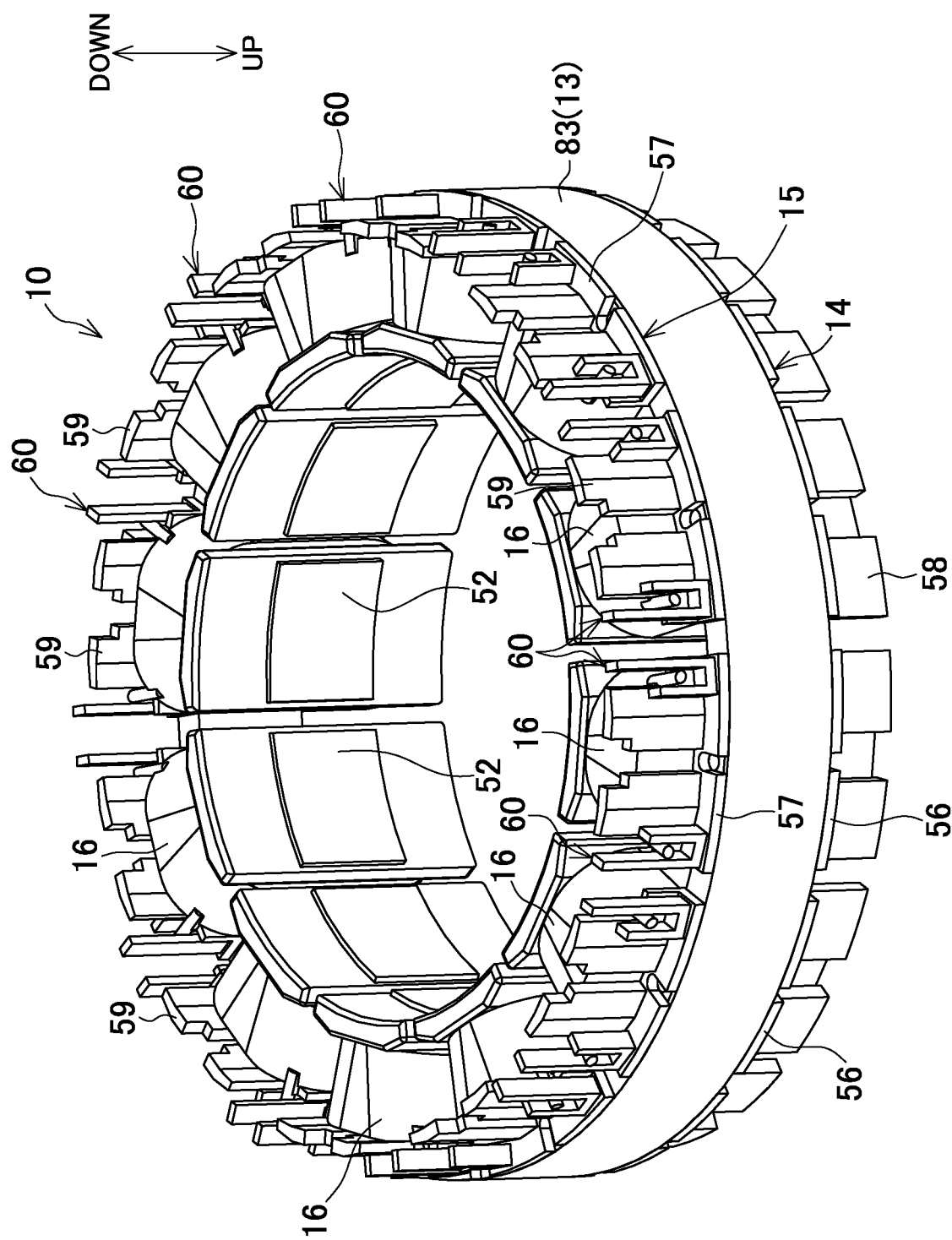
FIG. 14 is a perspective view of the stator from the lower side coated with a dust core.
Figure 15:
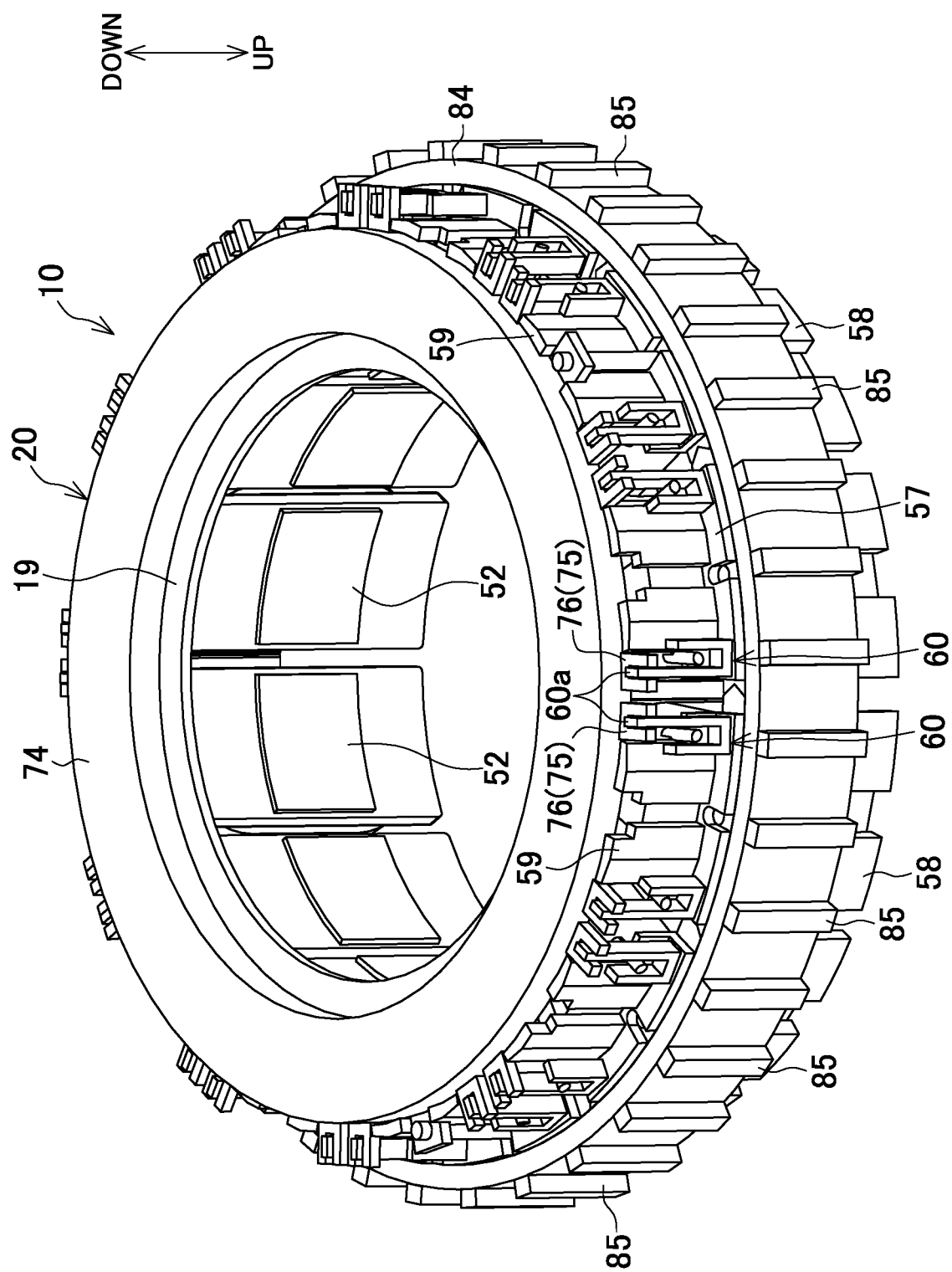
FIG. 15 is a perspective view of the stator from the lower side using a fixing member having ridges.

The fixation of the divided cores 50 (50A, 50B) are not limited to the integral molding with resin, and as illustrated in FIG. 14, outer peripheries can be coated with a dust core (a mixed material of a magnetic material, such as iron, and resin) 83, and as illustrated in FIG. 15, the outer peripheries can be fixed with a tubular fixing member 84 made of metal manufactured by shrinkage fitting or cold fitting. The use of such dust core 83 and fixing member 84 facilitates fixing the divided cores 50 (50A, 50B).

Especially, by disposing a plurality of ridges 85, 85, and so on as protrusion portions extending up and down at regular intervals in the circumferential direction on the outer periphery of the fixing member 84, the heat generated in the coils 16 can be effectively released via the fixing member 84. Additionally, the varnish or the adhesive may be interposed between the outer peripheries of the respective divided cores 50 (50A, 50B) and the fixing member 84 to improve integrity. The fixing member is not limited to have the cylindrical shape but may have a cornered tubular shape, or a part of the outer peripheral surface may be depressed.

Figure 16:
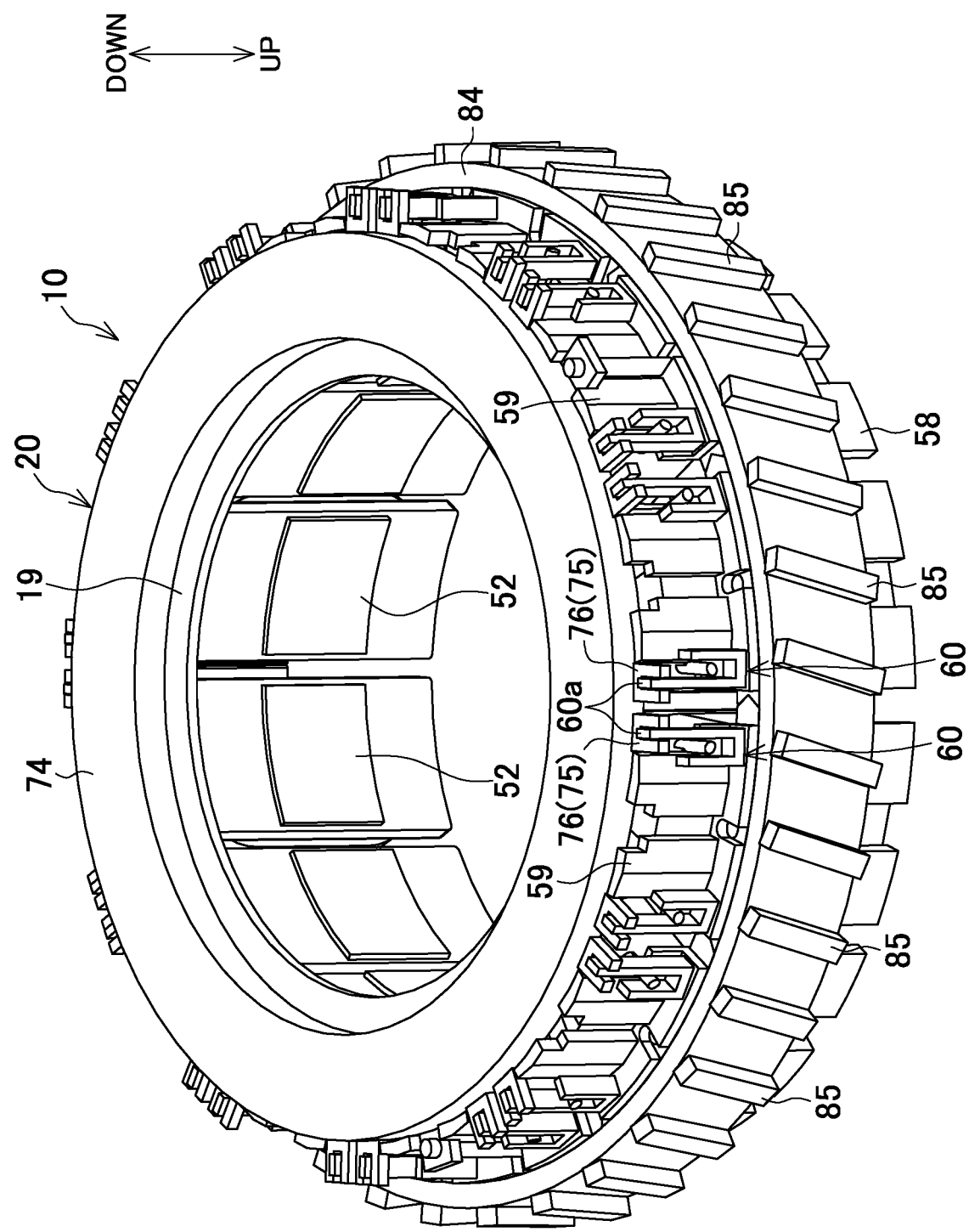
FIG. 16 is a perspective view of the stator from a lower side using the fixing member with the ridges inclined.

As illustrated in FIG. 16, the ridges 85 can be inclined with respect to an axial direction of the stator core. This configuration increases a surface area (cooling area) of the fixing member 84 including the ridges 85, leading to improvement in a heat release effect. It should be noted that, instead of the ridges, a plurality of protrusions may be formed.

In a case that the ridges 85 and the protrusions are arranged such that the cooling air from the centrifugal fan 28 is straightened, a noise caused by the cooling air can be reduced.

It should be noted that the bearing holder 77 to hold the bearing 21 on the lower side can be disposed on the fixing member 84, not the terminal unit 20.

Figure 17:
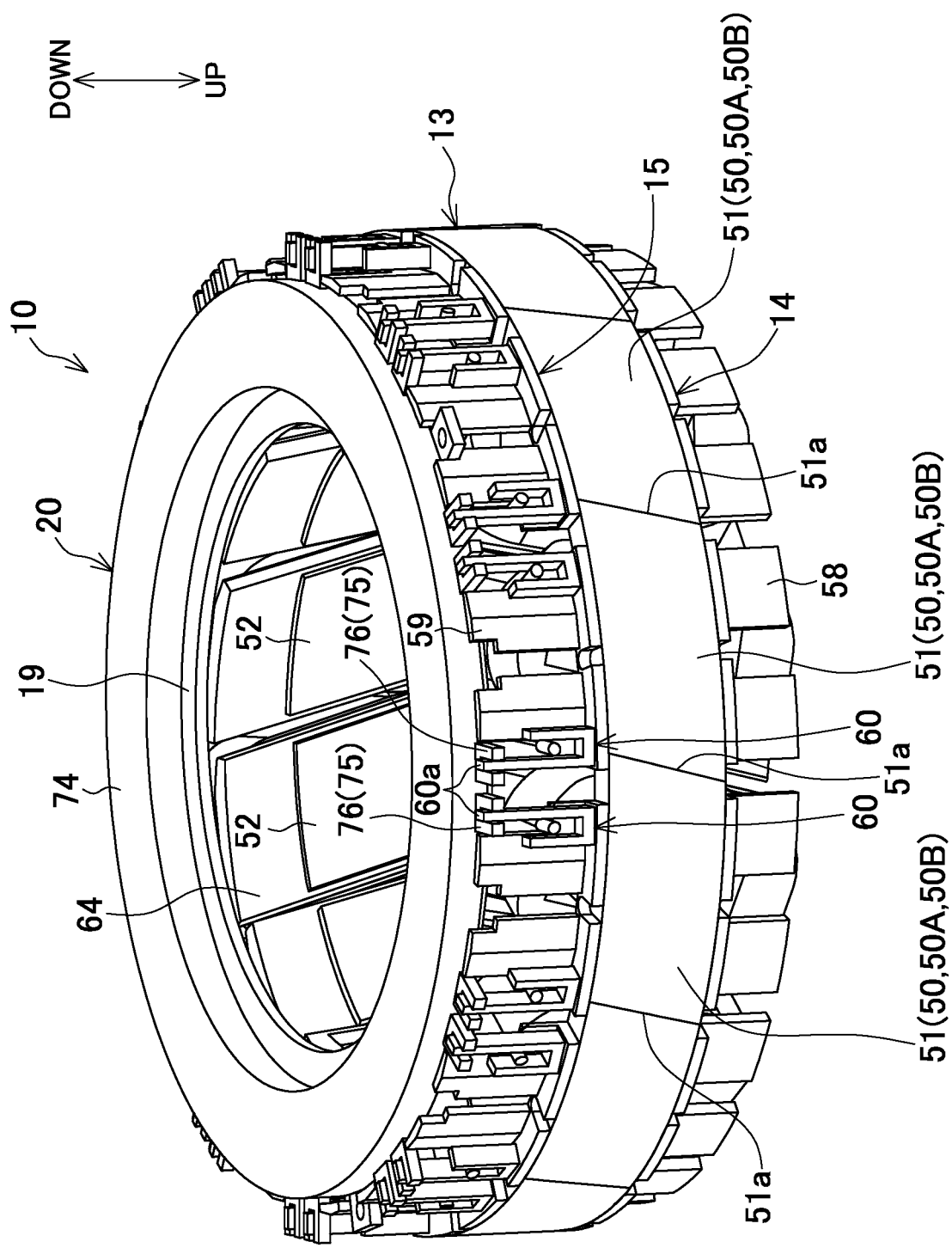
FIG. 17 is a perspective view of the stator from the lower side using divided cores with end edges of arc portions inclined.

Further, as illustrated in FIG. 17, both ends of the arc portions 51 of the divided cores 50 (50A, 50B) need not have a structure being formed into a straight line along the axial direction of the stator 10 but may have a structure of being inclined with respect to the axial direction and inclined end edges 51a, 51a are mutually joined by mating fitting. By thus inclining the joining portions, the integrity in the thrust direction is enhanced.

[Modification Example of Divided Cores (Heat Release Structure)]

Figure 18:
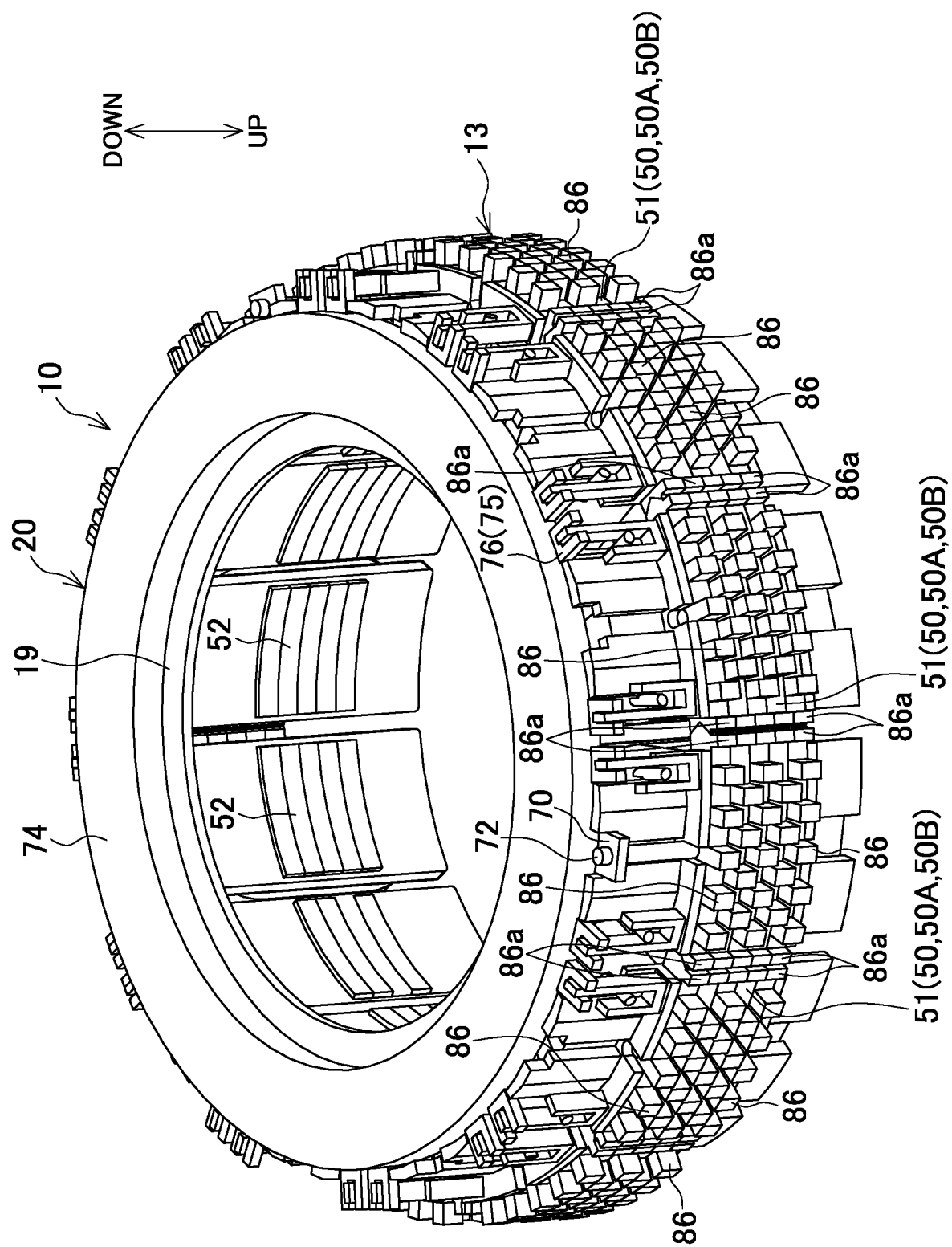
FIG. 18 is a perspective view of the stator from the lower side using divided cores including protrusion portions on outer peripheral surfaces of the arc portions.

As illustrated in FIG. 18, a plurality of protrusion portions 86, 86, and so on can be disposed in the outer peripheral surface of the arc portion 51 of each divided core 50 (50A, 50B). The protrusion portions 86 are disposed such that rows arranged at regular intervals in the up-down direction (the stacking direction of the electromagnetic steel plates) are disposed plurally at regular intervals in the circumferential direction. Between the rows adjacent in the circumferential direction, the protrusion portions 86, 86 are arranged such that the phases are displaced in the up-down direction in alternation. It should be noted that, on both ends of the arc portions 51, protrusion portions 86a, 86a, and so on are formed so as to be continuously arranged in the up-down direction, and rows of the protrusion portions 86a, 86a are adjacent between the end portions of the respective arc portions 51. The adjacent rows of the protrusion portions 86a, 86a are joined together by welding, with a separate sandwiching member, or the like to ensure the joining between the divided cores 50 (50A, 50B).

The respective protrusion portions 86 may be formed into a laminated state by forming a part of the protrusion portions 86, 86a on the respective electromagnetic steel plates forming the divided cores 50 (50A, 50B), or the separate protrusion portions 86, 86a may be joined to the arc portions 51.

[Effects Brought by Heat Release Structure of Protrusion Portions]

By thus disposing the plurality of protrusion portions 86, 86a on the outer peripheral surfaces of the respective divided cores 50 (50A, 50B), the heat generated in the coils 16 can be effectively released.

Especially, here, since the protrusion portions 86, 86a are arranged at the regular intervals along the stacking direction of the electromagnetic steel plates, the heat release effect can be equally obtained.

The protrusion portions 86a are disposed side by side into the straight line on both ends where the divided cores 50 (50A, 50B) are mutually joined and the rows of the protrusion portions 86a between the adjacent divided cores 50 (50A, 50B) are mutually welded or the like to join the divided cores 50 (50A, 50B). Therefore, a rational structure in which the divided cores 50 (50A, 50B) can be joined by using the protrusion portions 86a for heat release can be constructed.

It should be noted that when the protrusion portions 86 are arranged such that the cooling air from the centrifugal fan 28 is straightened, the noise caused by the cooling air can be reduced.

[Modification Example of Divided Configuration]

Figure 19:
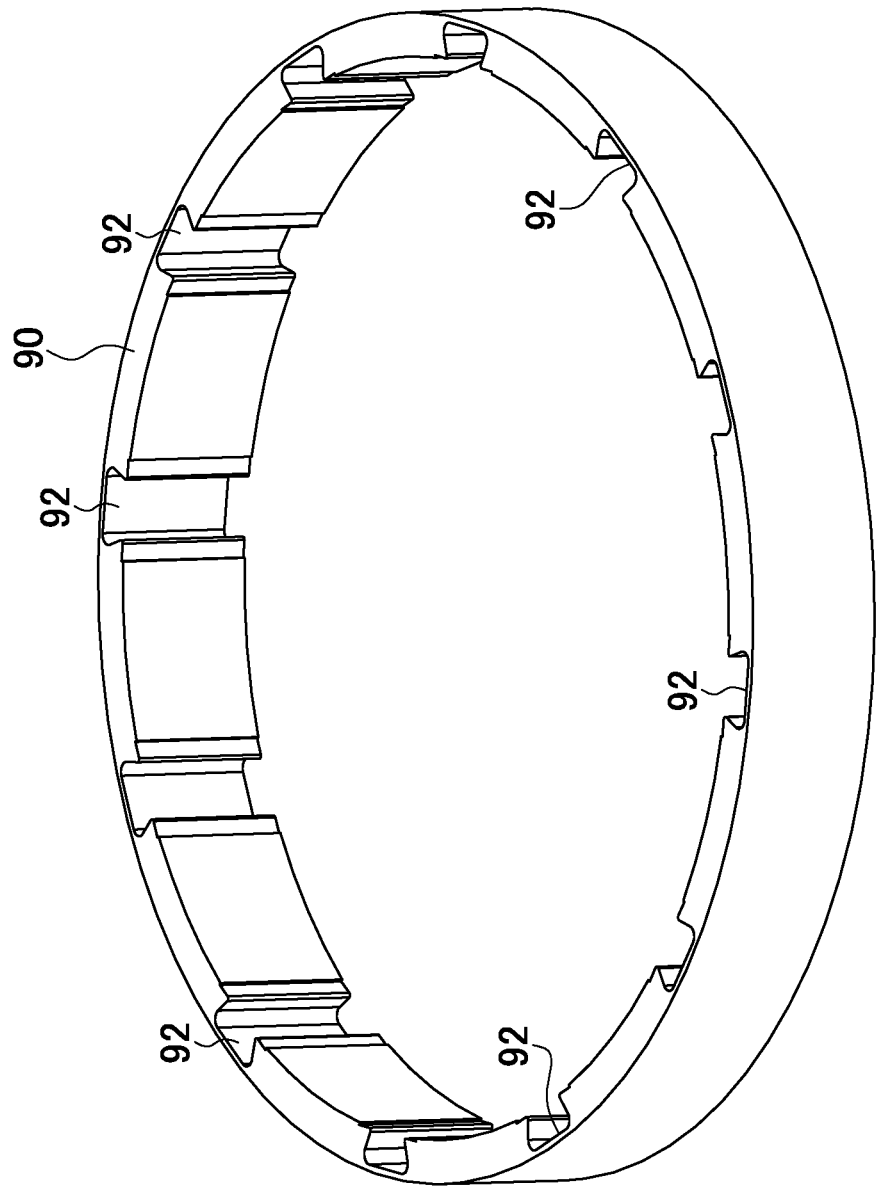
FIG. 19 is a perspective view of an outer peripheral portion.
Figure 20:
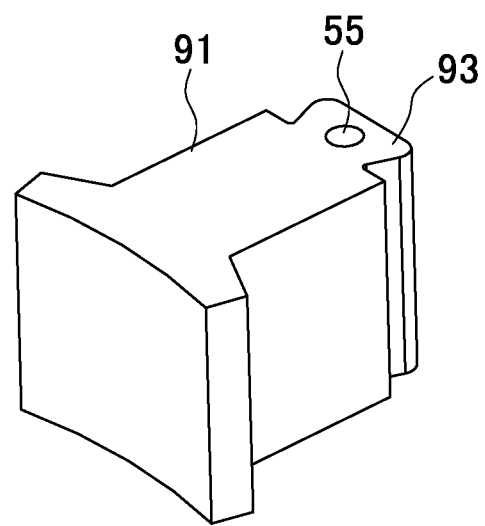
FIG. 20 is a perspective view of a tooth.

While the divided cores 50 (50A, 50B) according to the embodiments described above and modification examples have the structure formed of the arc portions 51 and the teeth 52 dividing the stator core 13 in the circumferential direction, the divided configuration is not limited to this configuration. For example, the stator core 13 can be divided into a cylindrical shaped outer peripheral portion 90 illustrated in FIG. 19 and a plurality of teeth 91, 91, and so on illustrated in FIG. 20. Here, dovetail grooves 92, 92, and so on penetrating up and down are formed at a positions where the teeth 91 are arranged in an inner surface of the outer peripheral portion 90, a dovetail tenon 93 fitted to the dovetail groove 92 is formed on an outer end of each tooth 91, and the through-hole 55 for the fixing pin 72 is formed in the dovetail tenon 93.

Figure 21A:
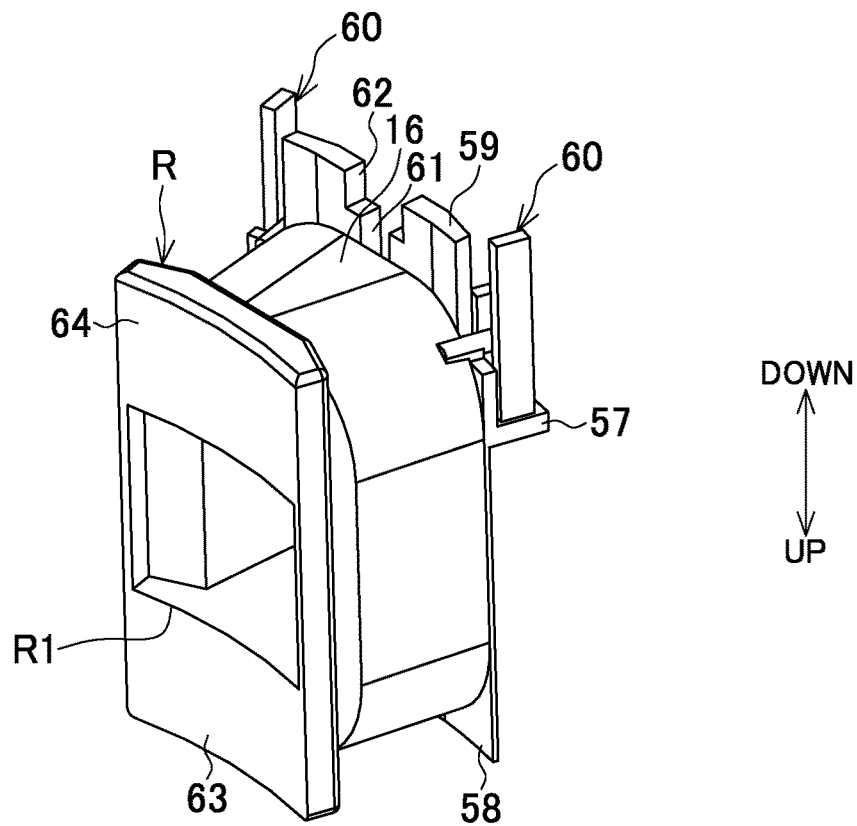
FIG. 21A is a perspective view of the tooth in which the resin molded portion is formed.

Meanwhile, as illustrated in FIG. 21A, the resin molded portion R is integrally molded into a tubular shape as follows. The resin molded portion R including the upper and lower insulating portions 56, 57 has an opening R1 into which the tooth 91 is inserted from the dovetail tenon 93 side to cover the tooth 91, and only the lower insulating portion 57 projects outside from the upper and lower outer ribs 58, 59. The coil 16 is wound around the resin molded portion R, and both terminals 16a, 16a are formed in a state being coupled to the terminal plates 60, 60.

Figure 21B:
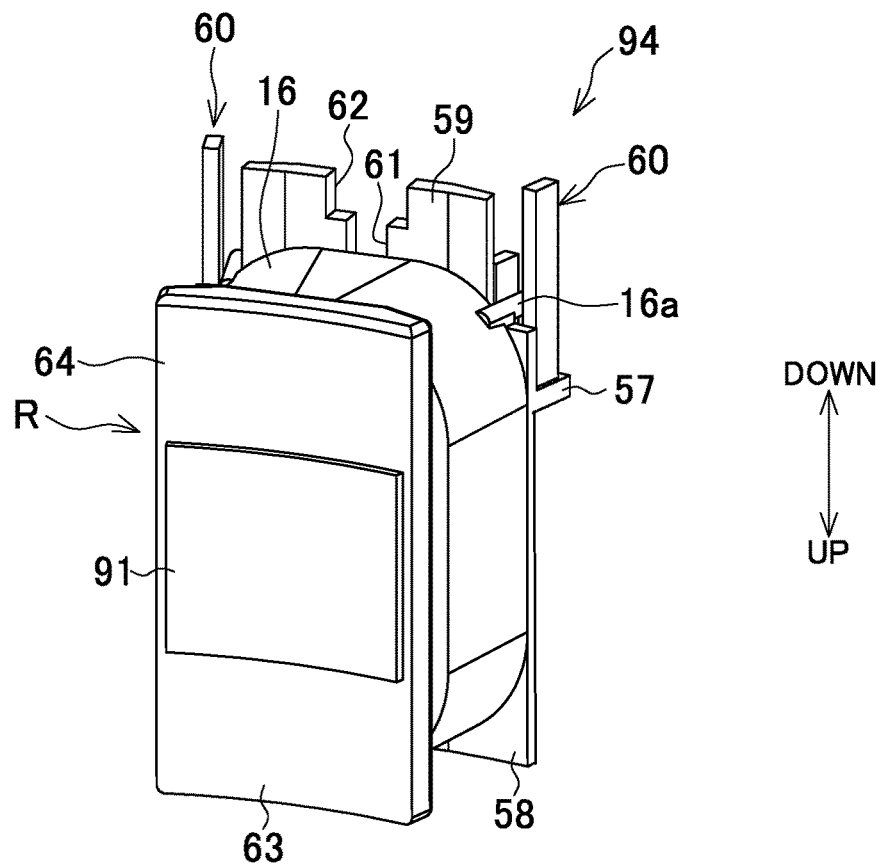
FIG. 21B is a perspective view of a divided body.
Figure 22:
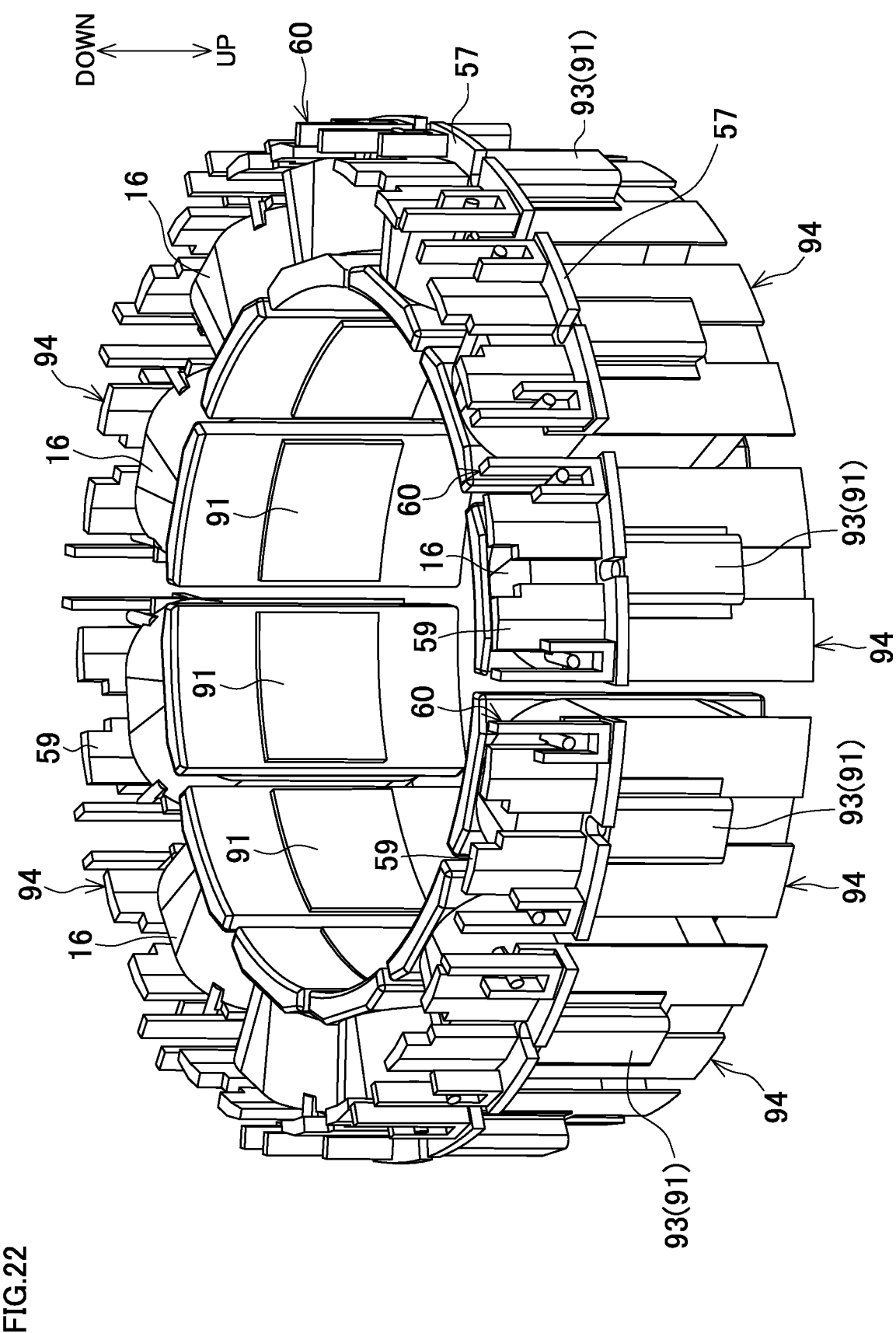
FIG. 22 is a perspective view from a lower side in a state of arranging the divided bodies.
Figure 23:
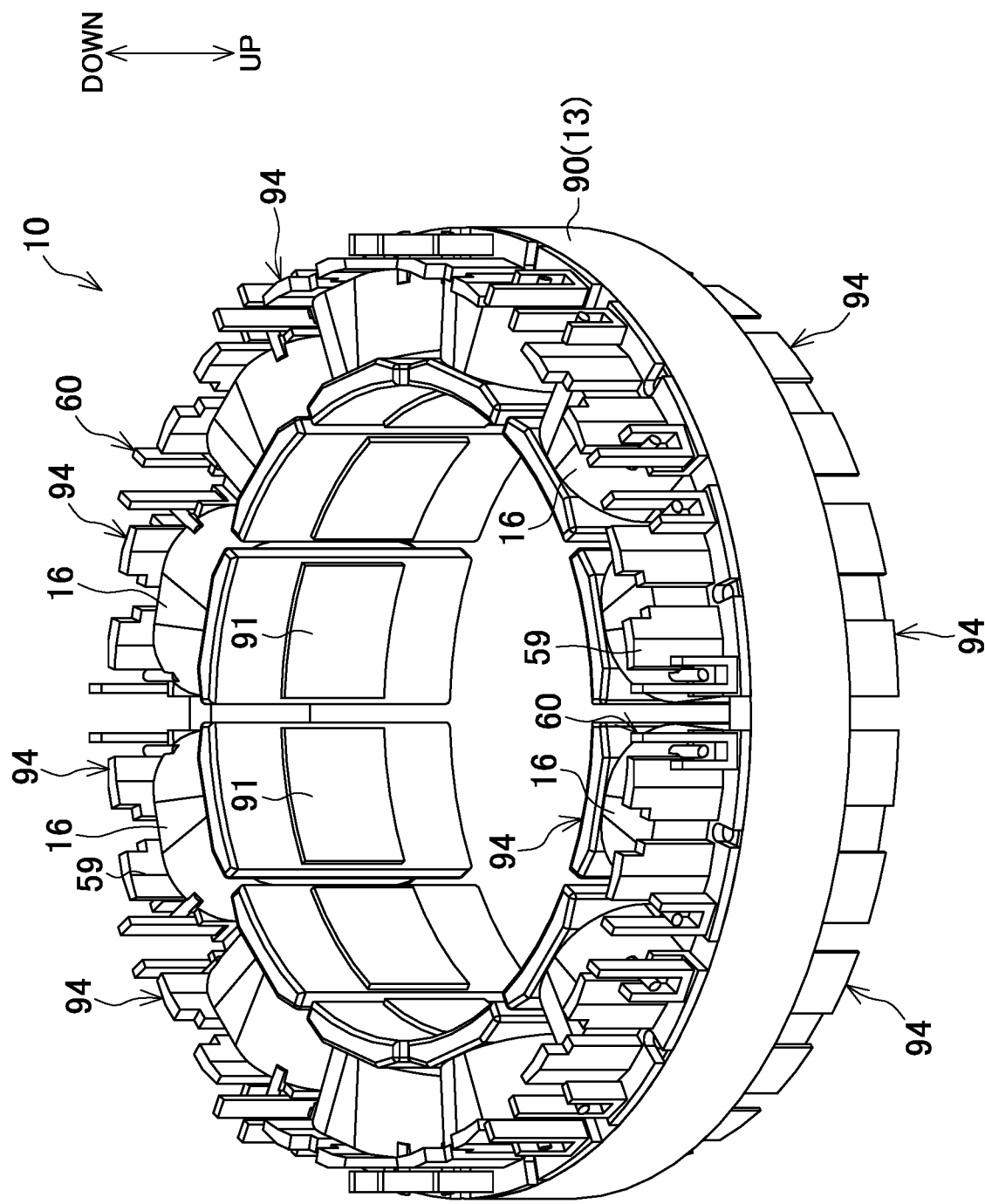
FIG. 23 is a perspective view from the lower side illustrating a state in which the divided bodies are joined to the outer peripheral portion.

Accordingly, as illustrated in FIG. 21B, when the tooth 91 is joined to the resin molded portion R from the inside such that the dovetail tenon 93 is inserted first, divided bodies 94, 94, and so on where the dovetail tenons 93 project outside are obtained as illustrated in FIG. 22. When the dovetail tenons 93 of the respective divided bodies 94 are fitted to the respective dovetail grooves 92 in the outer peripheral portion 90 from the lower side, the respective divided bodies 94 are joined to the outer peripheral portion 90 as illustrated in FIG. 23, thus obtaining the stator 10 becoming the stator core 13.

[Effects Brought by Divided Configurations of Outer Peripheral Portion and Teeth]

Thus, the stator core 13 is divided into the cylindrical shaped outer peripheral portion 90 and the plurality of teeth 91, which project from the inside of the outer peripheral portion 90 and around which the respective coils 16 are wound, and the stator core 13 is formed by joining the outer peripheral portion 90 and the teeth 91, thus ensuring maintaining the strength by the use of the continuous outer peripheral portion 90.

Especially, here, the teeth 91 are inserted into the resin molded portions R around which the coils 16 are preliminarily wound and are joined to the outer peripheral portion 90. Therefore, the assembly can be easily performed.

It should be noted that a relationship between the dovetail groove and the dovetail tenon may be set reverse to the configuration described above such that the dovetail tenons is formed in the outer peripheral portion and the dovetail grooves is formed in the teeth.

Figure 24:
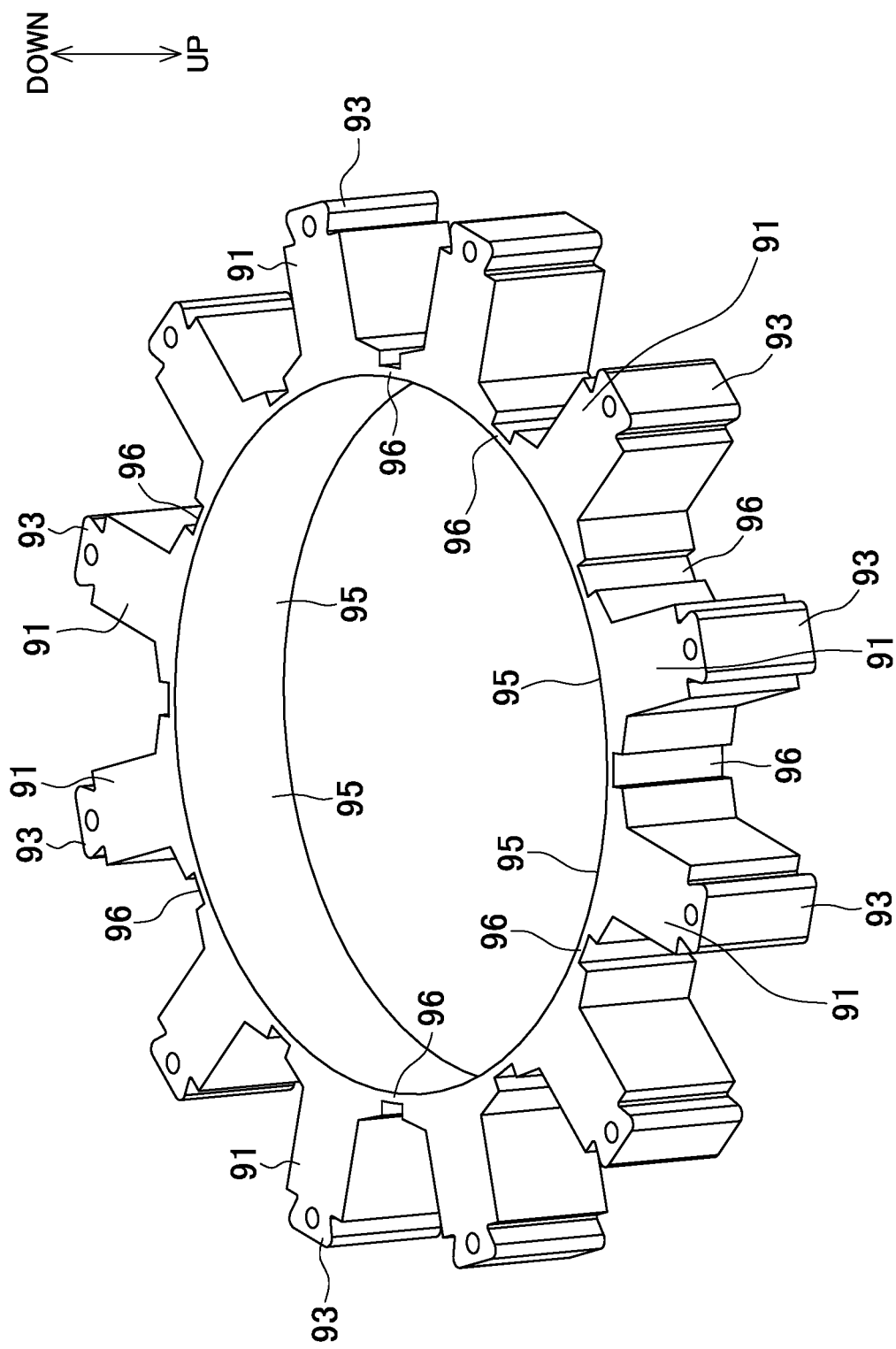
FIG. 24 is a perspective view illustrating a modification example of coupling the teeth together with joints.

While the divided configuration forms each of the teeth 91 independently, between projecting ends 95, 95 of the adjacent teeth 91, 91, joints 96, 96, and so on joining both projecting ends may be disposed, and all teeth 91, 91, and so on may be mutually fixed with the projecting ends 95, 95 to be integrated as illustrated in FIG. 24. In this case, it is sufficient to form the electromagnetic steel plates so as to have a shape including the joints 96.

Figure 25:
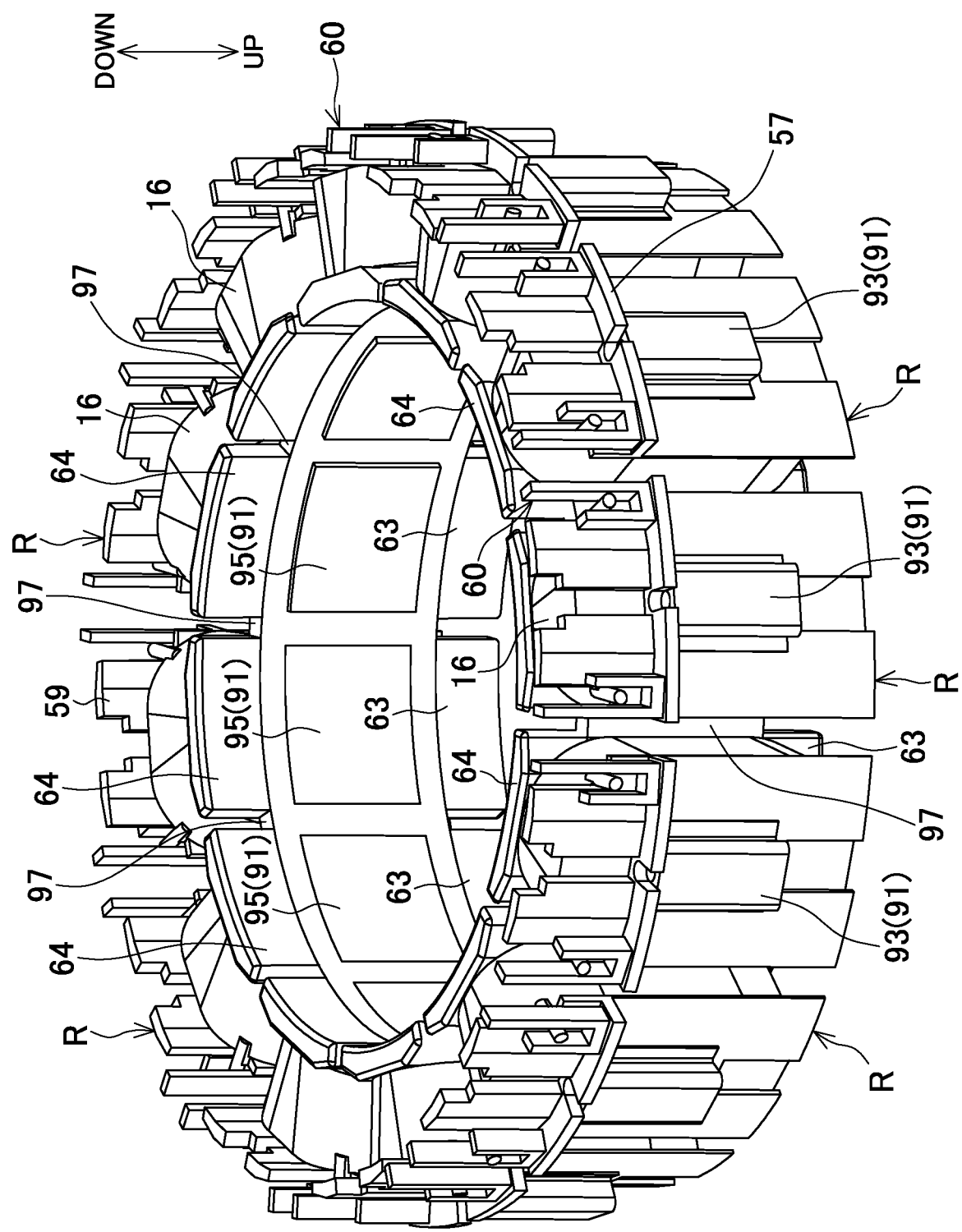
FIG. 25 is a perspective view from a lower side in a state where the divided bodies with the resin molded portions mutually connected are arranged.

Further, as illustrated in FIG. 25, coupling portions 97, 97 to couple between the upper and lower inner ribs 63, 64 may be integrally disposed between the projecting ends 95, 95 of the adjacent teeth 91, 91 in the respective resin molded portions R to ensure integrating all resin molded portions R via the coupling portions 97 as integrally molded resin.

Thus integrating the teeth 91 or the resin molded portions R facilitates the assembly to the outer peripheral portion 90 and also facilitates management.

Figure 26:
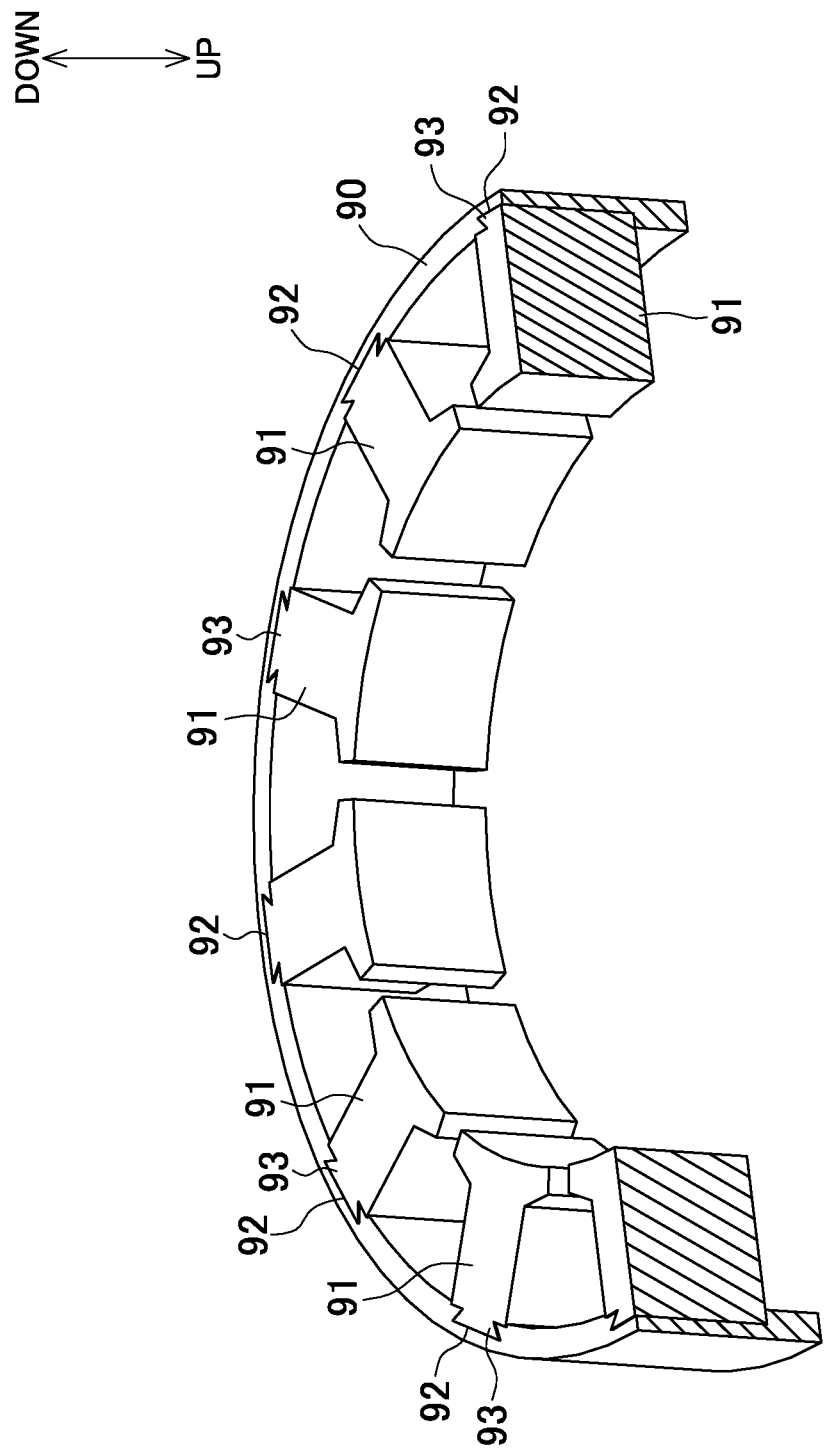
FIG. 26 is a perspective view illustrating an example in which an outer peripheral portion is longer than teeth.

Meanwhile, with such a divided configuration, separately forming the outer peripheral portion 90 and the teeth 91 can differentiate their axial lengths. FIG. 26 illustrates an example of forming the outer peripheral portion 90 longer than the teeth 91 to the one end side. Thus forming the outer peripheral portion 90 axially longer than the teeth 91 allows forming a three-dimensional magnetic circuit and increasing a freedom of design, leading to downsizing and a weight reduction.

The outer peripheral portions of these are not limited to have the cylindrical shape, and the outer peripheral surface and the inner peripheral surface may be a non-circular shape (a polygon and a shape having a partial unevenness).

Besides, in each of the present inventions, to achieve heat release, the switching element disposed in the controller may be thermally bonded to the protrusion portion on the stator core and the ridges on the fixing member via a thermal bonding member, and the switching element may be disposed in the sensor circuit board and similarly may be thermally bonded to the protrusion portion on the stator core and the ridges on the fixing member via the thermal bonding member.

As the magnet wire forming the coil, a flat wire may be used.

Furthermore, the number of coils (slots) is not limited to 12 and may be any number other than 12. Obviously, not limited to a hammer drill, as long as the brushless motor is used as a driving source, each of the present inventions is applicable to another electric tool, such as an impact driver and a circular saw.

The invention claimed is:

1. An electric tool comprising:
   a brushless motor including (i) a tubular stator which includes (a) a tubular stator core having a plurality of divided cores, (b) a plurality of insulators, and (c) a plurality of coils and (ii) a rotor which is inside the stator and includes (a) a rotor core, (b) a permanent magnet inside the rotor core, and (c) a rotation shaft fixed to the rotor core and passing through the stator, wherein:
   each of the plurality of divided cores is comprised of laminated electromagnetic steel plates and includes (i) an arc portion having a protruding portion on one end and a depressed portion on a second end in a circumferential direction of the stator core and (ii) teeth projecting inward from an inner surface of the arc portion;
   each of the plurality of insulators (i) is held by one of the plurality of divided cores and covers at least (a) the teeth of the one of the plurality of divided cores except for inward projecting ends and (b) both end surfaces of the arc portion in an axial direction of the stator core and (ii) including inner ribs which are on roots of the teeth and outer ribs which are on the projecting ends of the teeth in the axial direction;
   the coils are comprised of magnet wires that are wound around each of the teeth between the inner ribs and the outer ribs; and
   adjacent divided cores of the plurality of divided cores in the circumferential direction are joined such that the protruding portion of one of the adjacent divided cores of the plurality of divided cores engages the depressed portion of another of the adjacent divided cores of the plurality of divided cores;
   a ring shaped sensor circuit board (i) supported by the plurality of insulators at the one end of the each of the plurality of divided cores in the axial direction and (ii) through which the rotation shaft passes;
   a pinion configured to integrally rotate with the rotation shaft at the second end of the each of the plurality of divided cores in the axial direction;
   a centrifugal fan fixed to the rotation shaft at the second end of the each of the plurality of divided cores in the axial direction between the pinion and the rotor core;
   a motor housing which houses the brushless motor, the sensor circuit board, and the centrifugal fan;
   a gear configured to mesh with the pinion;
   an output housing which houses the pinion and the gear;
   a controller configured to obtain the rotating state of the rotor;
   a switch electrically coupled to the controller;
   a final output shaft configured to receive transmission of rotation by the gear and to which a tool bit is detachable; and
   a battery mounting portion configured to receive and retain a battery pack.

2. The electric tool according to claim 1, wherein the brushless motor includes a connection member (i) that connects the plurality of coils and (ii) is mounted to the plurality of insulators.

3. The electric tool according to claim 2, wherein the connecting member is mounted to the one end side of the each of the plurality of divided cores in the axial direction.

4. The electrical tool according to claim 3, wherein the sensor circuit board is supported by the plurality of insulators.

5. The electric tool according to claim 2, wherein the sensor circuit board is supported by the plurality of insulators.

6. The electric tool according to claim 1, wherein the sensor circuit board is supported by the plurality of insulators.

7. The electric tool according to claim 1, further comprising:
   a baffle plate between the stator and the centrifugal fan;
   wherein the motor housing, the centrifugal fan, the brushless motor, the controller and the baffle plate are configured such that air suctioned into the motor housing by rotation of the centrifugal fan cools the brushless motor after cooling the controller and then is discharged to the outside of the motor housing via the baffle plate.

* * * * *